US011967768B2

(12) United States Patent
Chen et al.

(10) Patent No.: US 11,967,768 B2
(45) Date of Patent: Apr. 23, 2024

(54) SLOT ARRAY ANTENNA

(71) Applicant: AGC Inc., Tokyo (JP)

(72) Inventors: Qiang Chen, Miyagi (JP); Osamu Kagaya, Tokyo (JP); Toshiki Sayama, Tokyo (JP); Takeshi Motegi, Tokyo (JP)

(73) Assignee: AGC INC., Tokyo (JP)

( * ) Notice: Subject to any disclaimer, the term of this patent is extended or adjusted under 35 U.S.C. 154(b) by 325 days.

(21) Appl. No.: 17/064,313

(22) Filed: Oct. 6, 2020

(65) Prior Publication Data

US 2021/0021051 A1 Jan. 21, 2021

Related U.S. Application Data

(63) Continuation of application No. PCT/JP2019/015478, filed on Apr. 9, 2019.

(30) Foreign Application Priority Data

Apr. 13, 2018 (JP) ................................ 2018-077333
Dec. 7, 2018 (JP) ................................ 2018-229768

(51) Int. Cl.
*H01Q 13/10* (2006.01)
*H01P 1/20* (2006.01)
(Continued)

(52) U.S. Cl.
CPC ............. *H01Q 21/064* (2013.01); *H01P 1/20* (2013.01); *H01Q 21/0075* (2013.01)

(58) Field of Classification Search
CPC .. H01Q 21/064; H01Q 21/0075; H01Q 21/06; H01Q 1/38; H01Q 13/106;
(Continued)

(56) References Cited

U.S. PATENT DOCUMENTS 5,061,943 A * 10/1991 Rammos .................. H01Q 1/38
343/789
6,317,094 B1 * 11/2001 Wu .................... H01Q 21/0087
343/770
(Continued)

FOREIGN PATENT DOCUMENTS

JP S50-124556 A 9/1975
JP H02-270406 A 11/1990
(Continued)

OTHER PUBLICATIONS

Hettak et al., "A New type of Array Antennas fed by CPW for 60 GHz ISM Applications," IEEE, 2009.
(Continued)

*Primary Examiner* — Awat M Salih
(74) *Attorney, Agent, or Firm* — Foley & Lardner LLP

(57) ABSTRACT

A slot array antenna includes a dielectric layer, a power feeding unit, a first coplanar waveguide formed in a conductor layer provided on one surface of the dielectric layer, and a second coplanar waveguide formed in the conductor layer, wherein each of the first coplanar waveguide and the second coplanar waveguide includes a first end part connected to a point to which the power feeding unit is connected or situated in proximity and at least one second end part connected to at least one slot formed in the conductor layer.

13 Claims, 20 Drawing Sheets

(51) Int. Cl.
*H01Q 21/00* (2006.01)
*H01Q 21/06* (2006.01)

(58) Field of Classification Search
CPC ......... H01Q 13/10; H01P 1/20; H01P 1/2016; H01P 5/12
See application file for complete search history.

(56) References Cited

U.S. PATENT DOCUMENTS

| | | | | |
|---|---|---|---|---|
| 7,292,196 | B2 * | 11/2007 | Waterhouse | H01Q 13/10 343/770 |
| 10,431,901 | B2 * | 10/2019 | Black | H01Q 21/06 |
| 2003/0218571 | A1 * | 11/2003 | Yoon | H01Q 9/065 343/824 |
| 2007/0216594 | A1 | 9/2007 | Uno et al. | |
| 2011/0090129 | A1 * | 4/2011 | Weily | H01Q 21/064 343/770 |
| 2020/0153108 | A1 * | 5/2020 | Uemichi | H01Q 13/106 |

FOREIGN PATENT DOCUMENTS

| | | | |
|---|---|---|---|
| JP | H07-235826 | A | 9/1995 |
| JP | H09-199935 | A | 7/1997 |
| JP | H09-307350 | A | 11/1997 |
| JP | 2000-196344 | A | 7/2000 |
| JP | 2006-086578 | A | 3/2006 |
| JP | 2008-054146 | A | 3/2008 |

OTHER PUBLICATIONS

Abdullah et al., "CPW Fed Double Bowtie Microstrip Slot Antenna 3 Array FR4 Substrate for 3.4 GHz Communication," International Journal of Basic Applied Sciences IJBAS-IJENS, vol. 11, No. 01, 2011, pp. 70-73.

Abdullah et al, "Microstrip antenna slot double-bowtie five-arrays model with coplanar waveguides for 5.8 GHz communication," The 6th International Conference on Theoretical and Applied Physics (The 6th ICTAP), 2017, pp. 050004-1-050004-5.

Chen et al., "A Wideband Coplanar Waveguide Antenna Array With Series Feed," IEEE Antennas and Wireless Propagation Letters, vol. 16, 2017, pp. 565-568.

Nesic, A., "Printed Slotted Array Excited by a Coplanar Waveguide," 12th European Microwave Conference, Sep. 1982, pp. 478-482.

McKnight et al., "A Series-Fed Coplanar Waveguide Slot Antenna Array," IEEE, 2010, 4 pages.

International Searching Authority, "International Search Report," issued in connection with International Patent Application No. PCT/JP2019/015478, dated Jun. 18, 2019.

International Searching Authority, "Written Opinion," issued in connection with International Patent Application No. PCT/JP2019/015478, dated Jun. 18, 2019.

* cited by examiner

Gain:7.9 dBi

YZ PLANE (VERTICAL PLANE)
XZ PLANE (HORIZONTAL PLANE)

LENGTH: λ/4

YZ PLANE (VERTICAL PLANE)
XZ PLANE (HORIZONTAL PLANE)

LENGTH: 3 λ/4

YZ PLANE (VERTICAL PLANE)
XZ PLANE (HORIZONTAL PLANE)

SLOT ARRAY ANTENNA

CROSS-REFERENCE TO RELATED APPLICATIONS

This application is a continuation of International Application PCT/JP2019/015478, filed on Apr. 9, 2019 and designated the U.S., which is based on and claims priority to Japanese patent application No. 2018-077333 filed on Apr. 13, 2018, and Japanese patent application No. 2018-229768 filed on Dec. 7, 2018. The entire contents of these applications are incorporated herein by reference.

BACKGROUND OF THE INVENTION

1. Field of the Invention

The disclosures herein relate to a slot array antenna.

2. Description of the Related Art

In recent years, services using high-speed and high-capacity wireless communication systems using microwave and millimeter-wave frequency bands have been expanding, such as the transition from 4G LTE to 5G (sub6). As an antenna used in such a frequency band, there is known a slot array antenna that feeds power to a plurality of slots by using a coplanar waveguide (for example, refer to Non-Patent Literature 1).

However, since slot array antennas, such as disclosed in Non-Patent Literature 1, feed power to a plurality of slots arranged in one direction with a common coplanar waveguide, the direction of directivity is limited to the direction of the arranged slots.

In this regard, it may be preferable to provide a slot array antenna with an improved design degree of freedom in the direction of directivity.

Non-Patent Literature 1: J. McKnight et al., A Series-Fed Coplanar Waveguide Slot Antenna Array, 2010 IEEE 11th Annual Wireless and Microwave Technology Conference

SUMMARY OF THE INVENTION

According to an embodiment, a slot array antenna includes a dielectric layer, a power feeding unit, a first coplanar waveguide formed in a conductor layer provided on one surface of the dielectric layer, and a second coplanar waveguide formed in the conductor layer, wherein each of the first coplanar waveguide and the second coplanar waveguide includes a first end part connected to a point to which the power feeding unit is connected or situated in proximity and at least one second end part connected to at least one slot formed in the conductor layer.

According at least one embodiment, the design degree of freedom of direction of directivity is improved.

DESCRIPTION OF THE PREFERRED EMBODIMENTS

Hereinafter, embodiments according to the present disclosure will be described with reference to the drawings. Furthermore, in each of the embodiments, deviation in a direction such as parallel, right-angle, orthogonal, horizontal, vertical, top and bottom, left and right, or the like is allowed to the extent that the effect of the present invention is not impaired. Furthermore, the X-axis direction, the Y-axis direction, and the Z-axis direction respectively represent a direction parallel to the X-axis, a direction parallel to the Y-axis, and a direction parallel to the Z-axis. The X-axis direction, the Y-axis direction, and the Z-axis direction are orthogonal to each other. The XY plane, the YZ plane, and the ZX plane respectively represent a virtual plane parallel to the X-axis direction and the Y-axis direction, a virtual plane parallel to the Y-axis direction and the Z-axis direction, and a virtual plane parallel to the Z-axis direction and the X-axis direction.

A slot array antenna according to an embodiment of the present disclosure is a coplanar feeding type planar array antenna that feeds power to a plurality of slots by using a plurality of coplanar waveguides, and is suitable for transmitting/receiving electromagnetic waves in a high frequency band such as microwaves or millimeter waves (for example, 0.3 GHz to 300 GHz). For example, a slot array antenna according to an embodiment of the present disclosure is applicable to, but is not limited to, a fifth-generation mobile communication system (so-called 5G), an on-vehicle radar system, and the like.

Figure 1:
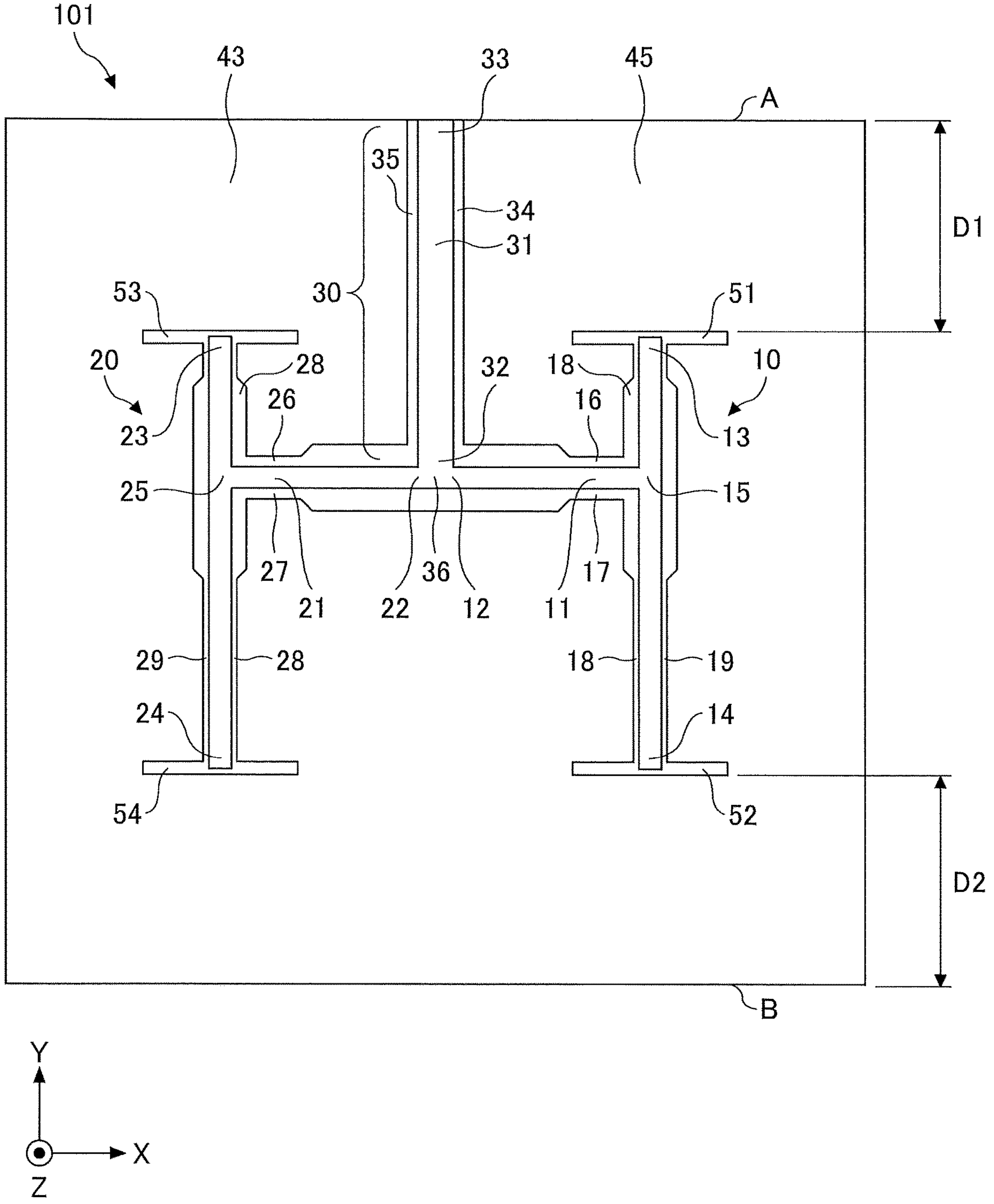
FIG. 1 is a plan view illustrating a slot array antenna of the first embodiment.

FIG. 1 is a plan view illustrating a slot array antenna according to the first embodiment of the present disclosure.

Figure 2:
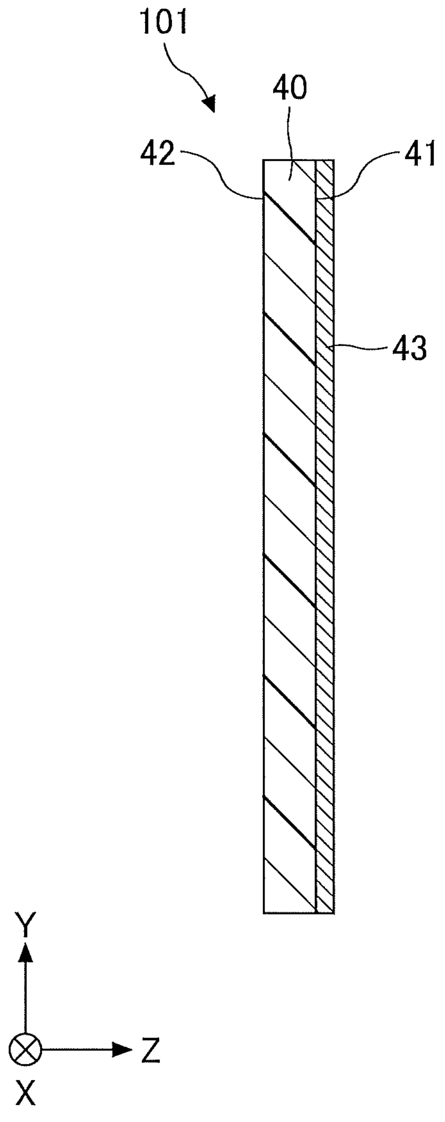
FIG. 2 is a side view illustrating a slot array antenna of the first embodiment.

FIG. 2 is a side view illustrating a slot array antenna of the first embodiment. A slot array antenna 101 shown in FIGS. 1 and 2 is an array antenna for combining and feeding power to a plurality of slot-shaped antenna elements through a coplanar waveguide that is formed so as to branch at least at one point of the conductor layer 43 provided on one side of the dielectric layer 40. By using the coplanar waveguide in which a center conductor layer and a ground conductor layer are provided on the same plane as a feeding path to the plurality of slot-shaped antenna elements, the array antenna can be configured on one plane. Since the array antenna can be configured on one plane, a simpler configuration and higher productivity can be realized as compared with, for example, a microstrip array antenna using both surfaces of the dielectric layer.

A slot array antenna 101 shown in FIGS. 1 and 2 includes a dielectric layer 40, a plurality of coplanar waveguides 10, 20, 30, and a plurality of slots 51-54.

A dielectric layer 40 is a plate-shaped or sheet-shaped base material including a dielectric material as the main component. A dielectric layer 40 includes a first surface 41 and a second surface 42 opposite to the first surface 41. A first surface 41 is parallel to the XY plane. A second surface 42 may be parallel to the XY plane or non-parallel. In other words, in the cross-sectional schematic diagram (YZ plane) of FIG. 2, the dielectric layer 40 illustrates, but is not limited to, a fixed thickness, i.e., rectangular shape. The second surface 42 of the dielectric layer 40 may not be parallel to the first surface 41, such that the cross-section of the dielectric layer is triangular or trapezoidal. Furthermore, the dielectric layer 40 may be a dielectric lens including such as a plano-convex shape or a plano-concave shape, and in this case, the second surface 42 may include a curved surface. In this manner, the dielectric layer 40 has a distribution in its thickness, so that the directivity of the antenna can be adjusted to the desired specification. Furthermore, the dielectric layer 40 having a distribution in its thickness is applicable not only to FIG. 2 but also to FIG. 3 described below. Furthermore, for example, the dielectric layer 40 may be a dielectric substrate or a dielectric sheet. Examples of the material of the dielectric layer 40 may include, but are not limited to, glass such as quartz glass, ceramics, fluororesins such as polytetrafluoroethylene, liquid crystal polymers, cycloolefin polymers, etc. A conductor layer 43 is provided on one surface 41 of the dielectric layer 40.

A conductor layer 43 is a planar layer whose surface is parallel to the XY plane. For example, the conductor layer 43 may be a conductor sheet, a conductor substrate, and the conductor layer 43 may have a non-uniform thickness and a distribution. Examples of the material of the conductor used for the conductor layer 43 may include, but are not limited to, silver and copper. Furthermore, the conductor layer 43 may be arranged in a mesh pattern so that a part of the dielectric layer can be seen. This allows, for example, the slot array antenna 101 including the mesh pattern to be made transparent or translucent when glass or resin having high transparency to visible light is used as the dielectric layer 40. The term "transparent" means, for example, a state in which a transmittance of 90% or more is obtained in visible light. Furthermore, various shapes can be applied to the mesh as long as the coplanar waveguides can be electrically connected, and the shapes are not particularly limited. The mesh part of the conductor layer 43 may be a part or all of the layer.

A coplanar waveguide 30 is an example of a power feeding unit and is a plane transmission line formed in a conductor layer 43. A coplanar waveguide 30 includes a pair of slots 34, 35 running parallel in the Y-axis direction, and a center conductor 31 extending in the Y-axis direction sandwiched between the pair of slots 34, 35. A conductor area outside the pair of slots 34, 35 in the conductor layer 43 functions as a ground conductor 45. A coplanar waveguide 30 includes one end part 32 connected to a point to be a junction (branching point 36) for coplanar waveguides 10, 20, and the other end part 33 connected to an external device not shown in the figure such as an amplifier. The other end part 33 serving as a feeding end is positioned at the edge of the dielectric layer 40 and the conductor layer 43.

A coplanar waveguide 10 is an example of a first coplanar waveguide and is a plane transmission line formed in a T-shape in the plan view of the conductor layer 43. A coplanar waveguide 10 includes a first waveguide extending in the X-axis direction and a second waveguide extending in the Y-axis direction. A coplanar waveguide 10 includes a pair of slots 16, 17 running parallel in the X-axis direction, a pair of slots 18, 19 running parallel in the Y-axis direction, and a center conductor 11 extending in a T-shape sandwiched between the slots 16-19.

In the slot array antenna 101 shown in FIG. 1, all slots 16-19 may have different widths, and this allows impedance matching of the antenna and impedance matching of the waveguide. The impedance matching described above may be performed not only in slots 16-19 but also in slots 26-29 of the coplanar waveguide 20 and slots 34, 35 of the coplanar waveguide 30 by making a part of the width of at least one or more of these slots different.

A conductor area outside the slots 16-19 in the conductor layer 43 functions as a ground conductor 45. A coplanar waveguide 10 includes an end part 12 connected to the branching point 36, an end part 13 connected to the slot 51, and an end part 14 connected to the slot 52. The end part 12 is an example of a first end part, and the end parts 13, 14 are an example of a second end part. A coplanar waveguide 10 includes a point to be a junction for slots 51, 52 (branching point 15) between the end part 12 and the end parts 13, 14.

A coplanar waveguide 20 is an example of a second coplanar waveguide and is a plane transmission line formed in a T-shape in the plan view of the conductor layer 43. A coplanar waveguide 20 includes a third waveguide extending in the X-axis direction and a fourth waveguide extending in the Y-axis direction. A coplanar waveguide 20 includes a pair of slots 26, 27 running parallel in the X-axis direction, a pair of slots 28, 29 running parallel in the Y-axis direction, and a center conductor 21 extending in a T-shape sandwiched between the slots 26-29.

A conductor area outside the slots 26-29 in the conductor layer 43 functions as a ground conductor 45. A coplanar waveguide 20 includes an end part 22 connected to the branching point 36, an end part 23 connected to the slot 53, and an end part 24 connected to the slot 54. The end part 22 is an example of a first end part, and the end parts 23, 24 are an example of a second end part. A coplanar waveguide 20 includes a point to be a junction for slots 53, 54 (branching point 25) between the end part 22 and the end parts 23, 24.

Each of the slots 51-54 is a slot-shaped antenna element formed in the conductor layer 43. Each of the slots 51-54 functions as a half-wavelength dipole antenna, and for example, when the wavelength at the operating frequency of the slots 51-54 is $\lambda_g$, length d of each slot 51-54 in the longitudinal direction is set to about $\lambda_g/2$. This allows the antenna gain of the slot array antenna 101 to be improved.

In this manner, the coplanar waveguides 10, 20 include end parts commonly connected to the branching point 36 connected to the coplanar waveguide 30 which is the third coplanar waveguide. In other words, the coplanar waveguides 10, 20 are respectively branched from the branching point 36 connected to the coplanar waveguide 30 which is a power feeding unit. Accordingly, since the direction that the coplanar waveguides 10, 20 extend can be designed separately, the design degree of freedom of the respective directions of the slots 51-54 connected to the respective end parts of the coplanar waveguides 10, 20 can be increased. Accordingly, the slot array antenna 101 can be provided with an improved degree of freedom for designing the direction of directivity.

Furthermore, it is preferable to adjust the position of the coplanar waveguide 30 which is the power feeding unit so that all phases of the high frequency currents flowing in each slot 51-54 are aligned (so that the slots 51-54 are fed in the same phase). In the case of FIG. 1, the coplanar waveguide 30 is positioned on the central axis of the H-shaped coplanar waveguide formed by the coplanar waveguides 10, 20. By feeding power to the slots 51-54 in the same phase, the antenna gain of the slot array antenna 101 can be improved.

In FIG. 1, the slots 51-54 are linear slot antennas. However, at least one of the slots 51-54 may be in other shapes, for example, an elliptical shape, a bow-tie shape, or a folded shape. By being formed in these shapes, the bandwidth of the slot array antenna 101 can be widened. In the case of a slot antenna other than a linear antenna, the extending direction in its shape is the longitudinal direction. For example, in the case of an ellipse-shaped slot antenna, the major axis direction corresponds to the longitudinal direction.

It is preferable that a part or all of the slots 51-54 are parallel to each other in terms of improving the antenna gain of the slot array antenna 101. In the case of FIG. 1, all slots 51-54 extend in the X-axis direction and are parallel to each other.

It is preferable that a part or all of the slots 51-54 are symmetrically positioned with respect to a symmetry axis in terms of improving the antenna gain of the slot array antenna 101. In the case of FIG. 1, when a virtual straight line passing through the branching point 36 is used as a symmetry axis in the plan view, the slots 51 and 53 are symmetrically positioned with respect to the virtual straight line, and the slots 52 and 54 are symmetrically positioned with respect to the virtual straight line.

It is preferable that each of the end parts of coplanar waveguides 10, 20 is connected at right angles to (longitudinal direction of) at least one slot connected to its end part in terms of improving the antenna gain of the slot array antenna 101. In the case of FIG. 1, the end part 13 of the coplanar waveguide 10 is connected to the slot 51 at right angles, the end part 14 of the coplanar waveguide 10 is connected to the slot 52 at right angles, the end part 23 of the coplanar waveguide 20 is connected to the slot 53 at right angles, and the end part 24 of the coplanar waveguide 20 is connected to the slot 54 at right angles.

If the slots 51-54 are positioned in each of four areas from dividing by two virtual straight lines orthogonal to each other at the branching point 36, it is possible to increase the direction of directivity at which the antenna gain becomes maximum. For example, in FIG. 1, it is assumed that a first virtual straight line extending in the X-axis direction and a second virtual straight line extending in the Y-axis direction cross orthogonally at the branching point 36. In other words, an XY coordinate plane with the branching point 36 as an origin is assumed. In this case, the slot 51 is positioned in the first quadrant, the slot 53 is positioned in the second quadrant, the slot 54 is positioned in the third quadrant, and the slot 52 is positioned in the fourth quadrant. By disposing at least one slot-shaped antenna element in each of the four areas, the directivity in the X-axis direction and the Y-axis direction is improved.

Figure 3:
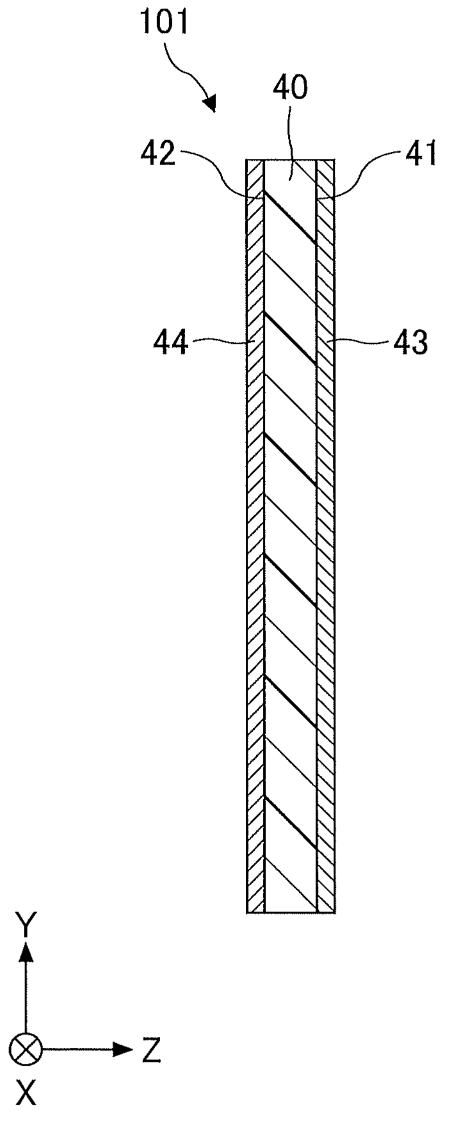
FIG. 3 is a side view illustrating another configuration example of the slot array antenna of the first embodiment.

FIG. 3 is a side view illustrating another configuration example of the slot array antenna of the embodiment according to the present disclosure. As shown in FIG. 3, the conductor layer 44 may be provided on a part or all of the second surface 42 which is the other surface of the dielectric layer 40. In the case of FIG. 3, the conductor layer 44 is formed on the second surface 42 on the opposite side of the first surface 41, and is illustrated, but is not limited to, as a planar conductor layer which is parallel to the XY plane. As described with regard to FIG. 2, if the dielectric layer 40 has a distribution in its thickness, the second surface 42 of the conductor layer 44 may be arranged along the surface that is not parallel to the XY plane. For example, the conductor layer 44 may be a conductor sheet or a conductor substrate. Examples of the material of the conductor layer 44 may include, but are not limited to, silver, copper, etc. Furthermore, the conductor layer 44 may not be limited to the configuration provided with the conductor having the uniform thickness, and may be formed of mesh similarly to other configuration examples of the conductor layer 43, in order to make the slot array antenna 101 transparent or translucent.

As shown in FIG. 3, the conductor layer 44 on the second surface 42 side is not connected to the conductor layer 43 on the first surface 41 side. In other words, the conductor layer 44 is not conductively connected to the conductor layer 43 by a connecting conductor such as a via penetrating the dielectric layer 40. However, the conductor layer 44 may be electrically connected to the ground conductor 45. The conductor layer 44 is disposed so as to face at least one of the slots 51-54 with the dielectric layer 40 interposed therebetween. Consequently, since the conductor layer 44 functions as a reflecting conductor for reflecting electromagnetic waves radiated from at least one of the slots, a directivity to the positive side in the Z-axis direction is improved. A similar effect also may be obtained by applying the embodiment described later.

As previously described, a parasitic element (parasitic conductor) such as the conductor layer 44 may be provided on a part of the second surface 42 of the dielectric layer 40. In this case, the parasitic conductor may be provided in a predetermined area so that the antenna gain with the desired directivity can be obtained, for example, by aligning with the position of at least one slot out of a plurality of slots 51-54, preferably all the slots, when viewed from the normal direction (the Z-axis direction) of the first surface 41. For example, when the parasitic conductor is provided on a part of the second surface 42 of the dielectric layer 40, it is preferable to overlap with at least one of the slots 51-54 when viewed from the normal direction (the Z-axis direction) of the first surface 41. With this arrangement, the directivity to the negative side in the Z-axis direction with respect to the dielectric layer 40 is enhanced, and the parasitic conductor can function as a waveguide. Furthermore, when the parasitic conductor is provided on a part of the second surface 42 of the dielectric layer 40, the planar shape of the parasitic conductor may not be limited to the shape of a square, rectangle, polygon, circle, ellipse or the like, but may also be a shape forming an area having any outer edge. In this case, the free space wavelength of the electromagnetic wave to be transmitted and received is set to $\lambda_0$, the wavelength shortening rate of the dielectric layer 40 at the wavelength $\lambda_0$ is set to k, and the wavelength $\lambda_d = k \times \lambda_0$.

For example, when the planar shape of the parasitic conductor is a polygon including a square, the diagonal line of the polygon is set to $\lambda_d/2$ or less, when the planar shape is a circle, the diameter of the circle is set to $\lambda_d/2$ or less, and when the planar shape is an ellipse, the major axis of the ellipse is set to $\lambda_d/2$ or less.

Furthermore, a parasitic element (parasitic conductor) such as the conductor layer 44 may be disposed on the second surface 42 side of the dielectric layer 40 apart from the second surface 42 (in the −Z-axis direction), and may be disposed on the first surface 41 side of the dielectric layer 40 apart from the conductor layer 43 (in the +Z-axis direction). Furthermore, when a parasitic conductor such as the conductor layer 44 is disposed on the second surface 42 side of the dielectric layer 40 apart from the second surface 42, the parasitic conductor, as previously described, may be disposed to overlap with at least one slot, preferably all slots. When disposing a conductor layer 44 functioning as a reflector (reflecting conductor) on the second surface 42 side of the dielectric layer 40 apart from the second surface 42, the directivity to the positive side in the Z-axis direction on the basis of the dielectric layer 40 is increased. By disposing the conductor layer 44 on the second surface 42 side of the dielectric layer 40 apart from the second surface 42, the conductor layer 44 can function as a reflecting conductor. Furthermore, with regard to the dielectric layer 40, when the first surface 41, the second surface 42 and the conductor layer 44 are disposed in parallel, it is preferable that the conductor layer 44 is disposed apart from the second surface 42 at a distance greater than 0 and not more than $\lambda_0/4$. Furthermore, in order to separate the dielectric layer 40 from the conductor layer 44 to a predetermined distance, for example, a spacer may be provided at the end part of the slot array antenna 101, or the slot array antenna 101 may be fixed by a bracket or the like to hold the distance.

In FIG. 1, when the XZ plane is made parallel to a horizontal plane and at least one of the slots 51-54 is extending in the X-axis direction, the antenna gain in the Z-axis direction is improved with regard to transmitting and receiving vertically polarized electromagnetic waves. In the case of FIG. 1, the longitudinal direction of each of the slots 51-54 is parallel to the X-axis direction.

In FIG. 1, the slot array antenna 101 can transmit and receive vertically polarized electromagnetic waves (waves polarized in the Y-axis direction) since the slots 51-54 are extending along the X-axis direction. The directivity of the vertically polarized electromagnetic waves can be adjusted by the shortest distance (D1 or D2) from at least one of the slots 51-54 to an end edge (end edge A or end edge B) which is parallel to the longitudinal direction of the slot of the slot array antenna 101, in the plan view (the XY plane) of the slot array antenna 101. Concretely in FIG. 1, the shortest distances D1, D2 correspond to the shortest distances from each slot to the end part (end edge) of the conductor layer 43 parallel to the longitudinal direction of each slot, in a direction perpendicular to the extending direction of the slots 51-54 on the XY plane. When the wavelength of the electromagnetic wave to be transmitted and received is λ, the directivity of the vertical polarization can be adjusted by setting D1 and D2 to the distance of $n\times\lambda/4$ (n is an arbitrary value other than 0). Furthermore, D1 and D2 may be different as long as the distances are $n\times\lambda/4$, but it is preferable that the distances are equal because the balance of the directivity of antenna gain is easily adjusted.

FIG. 18-22 are graphs illustrating the directivity of the YZ plane (vertical plane) and the XZ plane (horizontal plane) of the slot array antenna 101 when n=1, 2, 3, and 4 for the vertically polarized 28 GHz electromagnetic waves. FIG. 18-22 illustrate the cases of:

$$D1,D2=\lambda/4=2.7\text{ mm} \quad \text{(FIG. 18)}$$

$$D1,D2=2\lambda/4=5.4\text{ mm} \quad \text{(FIG. 19)}$$

$$D1,D2=3\lambda/4=8.1\text{ mm} \quad \text{(FIG. 20)}$$

$$D1,D2=4\lambda/4=10.8\text{ mm} \quad \text{(FIG. 21).}$$

In FIG. 18-22, the half-width value of the main beam on the YZ plane (vertical plane) are 32.2°, 35.7°, 57.1°, and 53.6° respectively, and the half-value widths of the main beam on the XZ plane (horizontal plane) are 34.9°, 37.3°, 47.9°, and 40.3° respectively. By changing the value of n (distance D1, D2), particularly the directivity of the YZ plane (vertical plane) can be adjusted.

Figure 4:
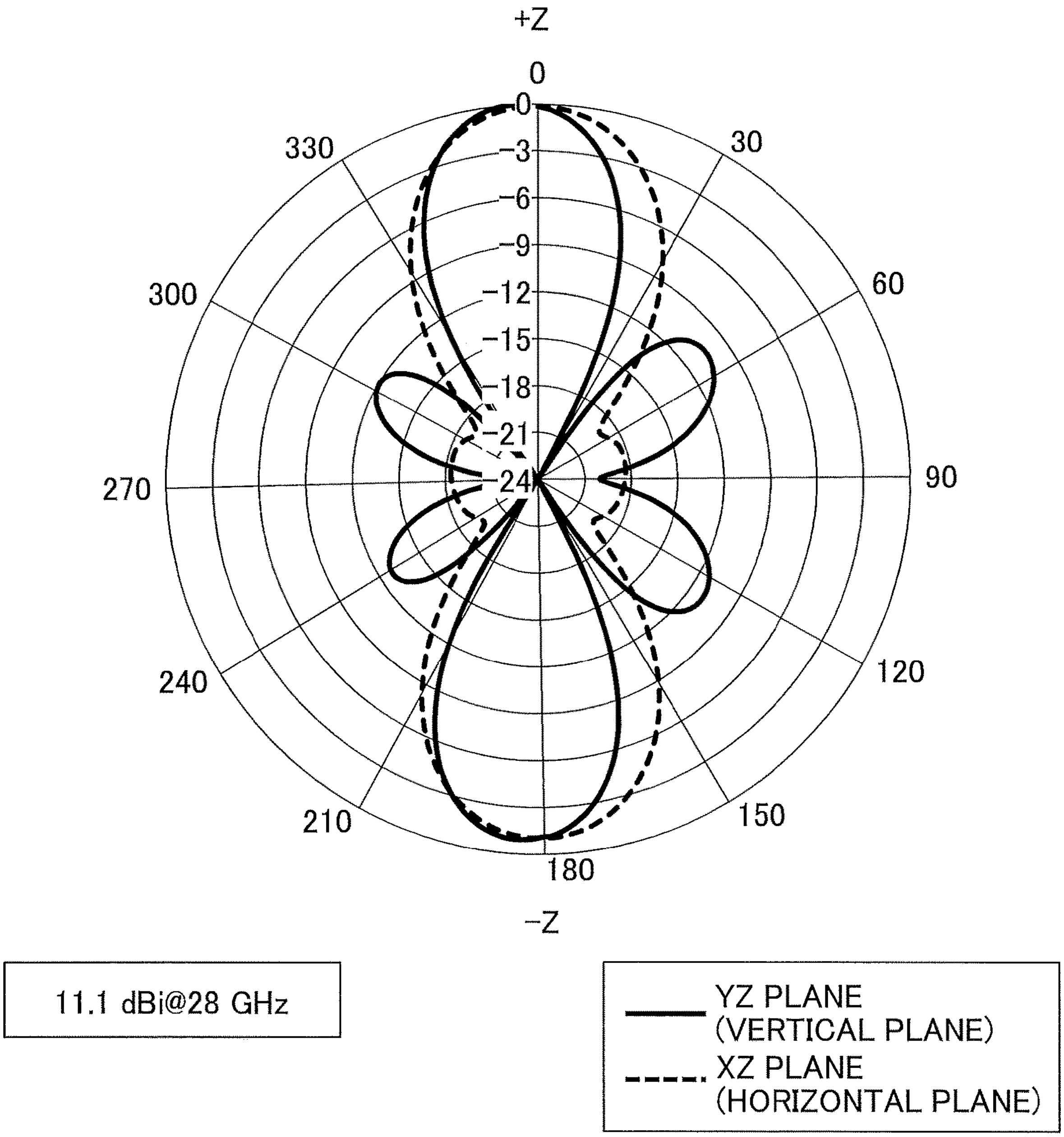
FIG. 4 illustrates a directivity of the slot array antenna of the first embodiment.

FIG. 4 illustrates the directivity of the slot array antenna 101 for the vertically polarized 28 GHz electromagnetic waves, and illustrates the antenna gain of the YZ plane and the XZ plane respectively. As shown in FIG. 4, the direction of directivity is directed to both the positive and negative sides of the Z-axis direction, and 11.1 dBi was obtained as the peak value of antenna gain. Furthermore, in FIG. 4, D1=D2=4.5 mm.

Figure 5:
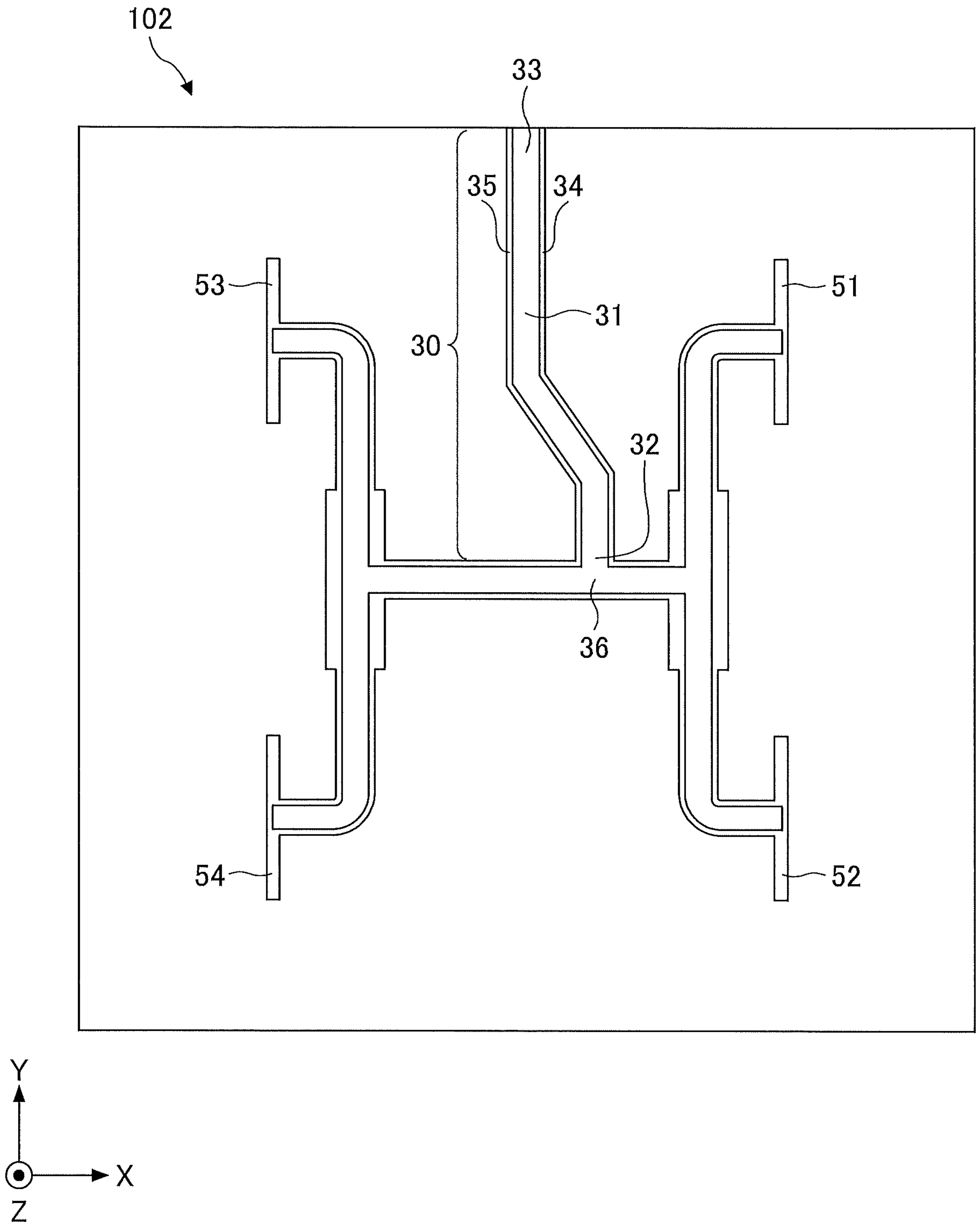
FIG. 5 is a plan view illustrating a slot array antenna of the second embodiment.

FIG. 5 is a plan view illustrating a slot array antenna of the second embodiment according to the present disclosure. The description of the similar configuration and effect as those of the above-described embodiment will be omitted by referring the above description. In the slot array antenna 102 shown in FIG. 5, the direction in which slots 51-54 extend is different from the slot array antenna 101 shown in FIG. 1.

In FIG. 5, when the XZ plane is made parallel to a horizontal plane and at least one of the slots 51-54 extends in the Y-axis direction, the antenna gain in the Z-axis direction is improved with regard to transmitting and receiving horizontally polarized 28 GHz electromagnetic waves. In the case of FIG. 5, the longitudinal direction of each of the slots 51-54 is parallel to the Y-axis direction.

Furthermore, it is preferable to adjust the position of the coplanar waveguide 30 so that all phases of the high frequency currents flowing in the slots 51-54 are aligned (so that the slots 51-54 are fed in the same phase). In the case of FIG. 5, the end part 32 of the coplanar waveguide 30 is connected to the branching point 36 at a position deviated from the central axis of the H-shaped coplanar waveguide formed by coplanar waveguides 10 and 20.

Furthermore, not all of the slots 51-54 may extend in the same direction, and a part of the slots and the remaining slots may extend in different directions. For example, a part of the slots may extend in the X-axis direction and the remaining slots may extend in the Y-axis direction to correspond to both vertical polarization and horizontal polarization. However, it is preferable that all the slots 51-54 extend in the same direction because the transmitting and receiving sensitivity of a predetermined polarized wave can be enhanced.

Furthermore, the coplanar waveguide 30 may be linear, but also may include a bent part for sufficiently securing a distance from the slot in order to suppress deterioration of the characteristics such as directivity due to a coupling caused by proximity to the slot functioning as the antenna element. In the case of FIG. 5, the coplanar waveguide 30 is bent so that a sufficient distance from the slot 51 can be obtained. By bending the coplanar waveguide as shown in FIG. 5, the characteristics such as directivity can be improved more than the case where the coplanar waveguide is not bent.

Figure 6:
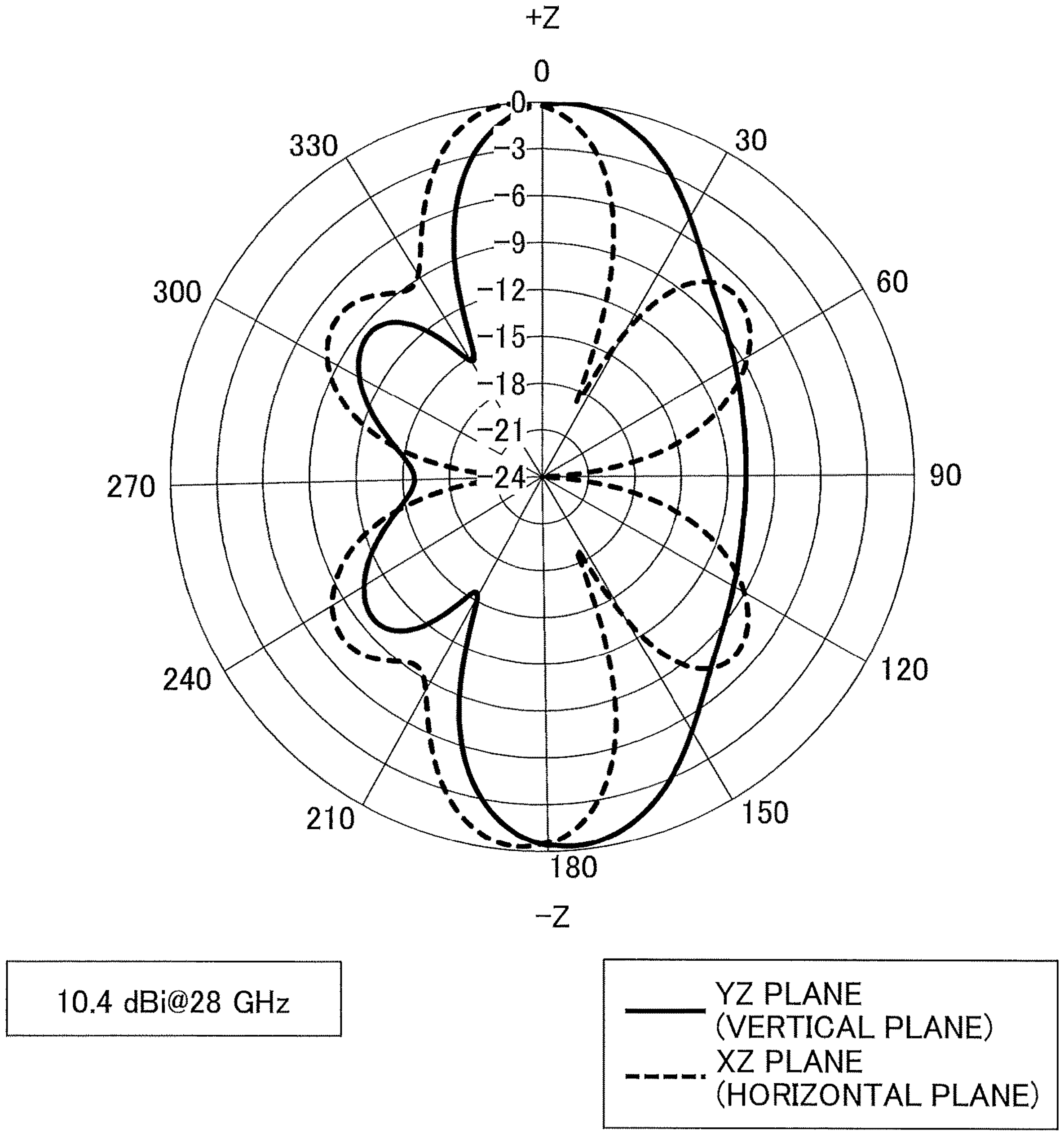
FIG. 6 illustrates the directivity of a slot array antenna of the second embodiment.

FIG. 6 illustrates a directivity of the slot array antenna 102 for the horizontally polarized 28 GHz electromagnetic waves, and illustrates the antenna gain of the YZ plane and the XZ plane respectively. As shown in FIG. 6, the direction of directivity is directed to both the positive and negative sides of the Z-axis direction, and 10.4 dBi was obtained as the peak value of antenna gain.

Figure 7:
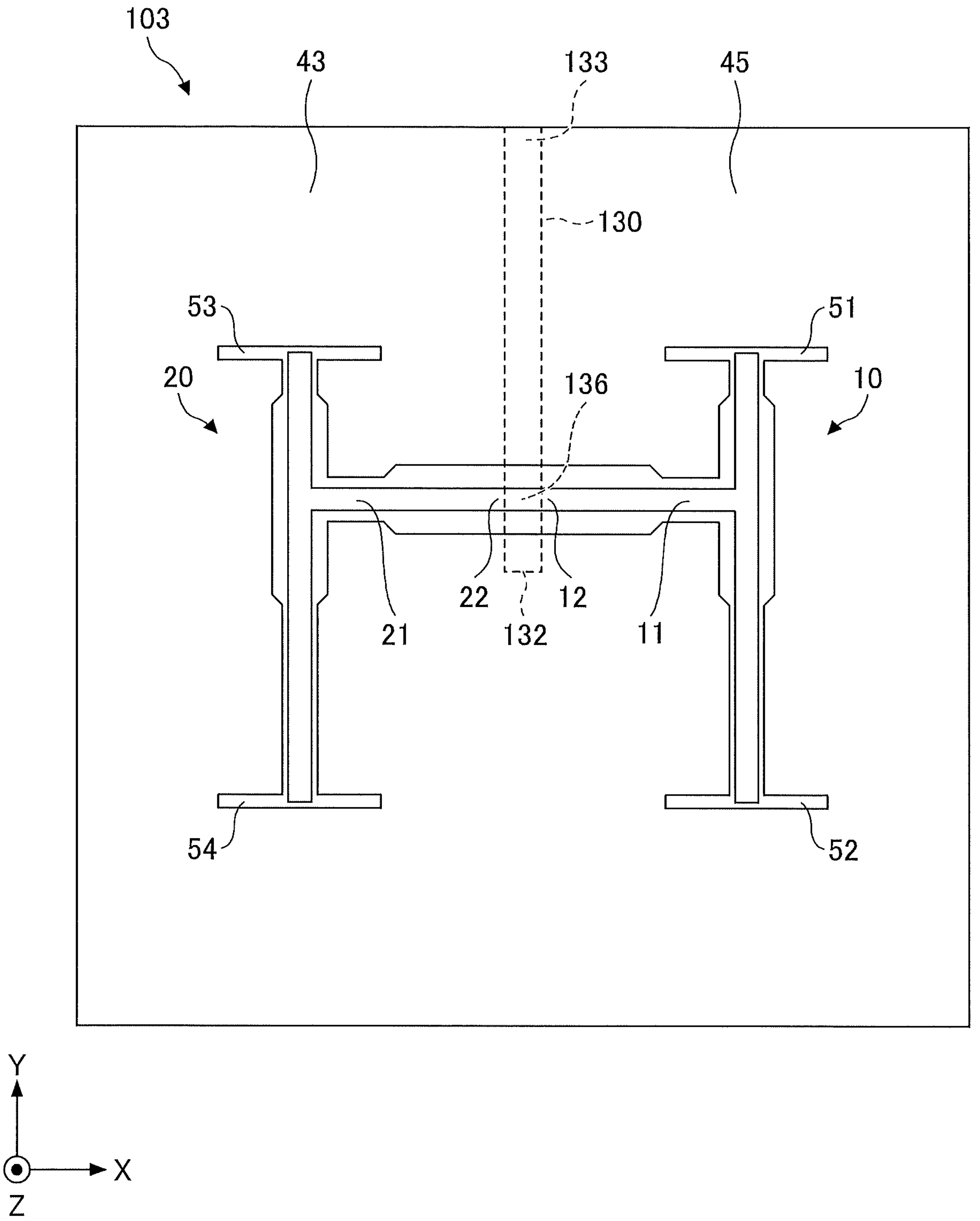
FIG. 7 is a plan view illustrating a slot array antenna of the third embodiment.
Figure 8:
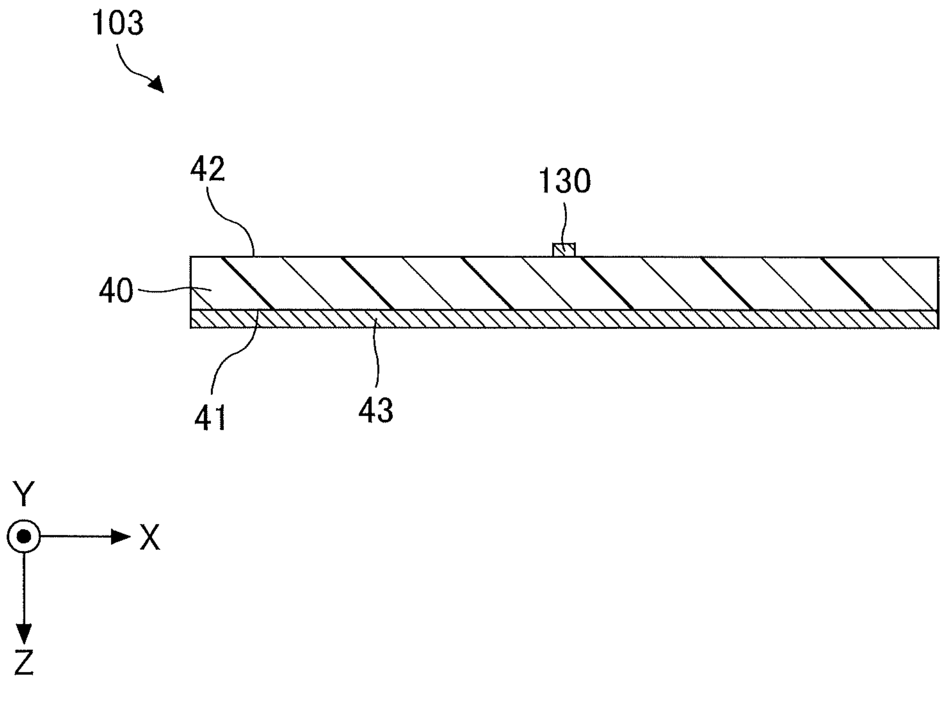
FIG. 8 is a side view illustrating a slot array antenna of the third embodiment.

FIG. 7 is a plan view illustrating a slot array antenna of the third embodiment according to the present disclosure. FIG. 8 is a side view illustrating a slot array antenna of the third embodiment. The description of the similar configuration and effect as those of the above-described embodiment will be omitted by referring the above description. In the slot array antenna 103 shown in FIGS. 7 and 8, the shape of the power feeding unit for feeding power to the coplanar waveguides 10, 20 is different from that of the slot array antenna 101 shown in FIG. 1. The coplanar waveguide 30 of the slot array antenna 101 feeds power to the coplanar waveguides 10, 20 by contact feeding, while the strip conductor 130 of the slot array antenna 103 feeds power to the coplanar waveguides 10, 20 by contactless feeding.

In FIG. 7, the strip conductor 130 is an example of a power feeding unit. The strip conductor 130 is provided on the surface 42 in proximity to the branching point 136. A microstrip line is formed by a strip conductor 130, a ground conductor 45 (a part of a conductor layer 43), and a dielectric layer 40. A strip conductor 130 extends in the Y-axis direction and faces the ground conductor 45 through the dielectric layer 40. A strip conductor 130 includes one end part 132 in proximity to a point to be a junction (branching point 136) for coplanar waveguides 10, 20, and the other end part 133 connected to an external device not shown in the figure such as an amplifier. The other end part 133 serving as a feeding end is positioned at the edge of the dielectric layer 40 and the conductor layer 43. In the plan view, the strip conductor 130 intersects (preferably orthogonally intersects) the linear line part where the coplanar waveguides 10, 20 respectively extend from the branching point 136. The one end part 132 projects from the branch point 136. This configuration allows the strip conductor 130 to feed power to the coplanar waveguides 10, 20 by contactless feeding.

Figure 9:
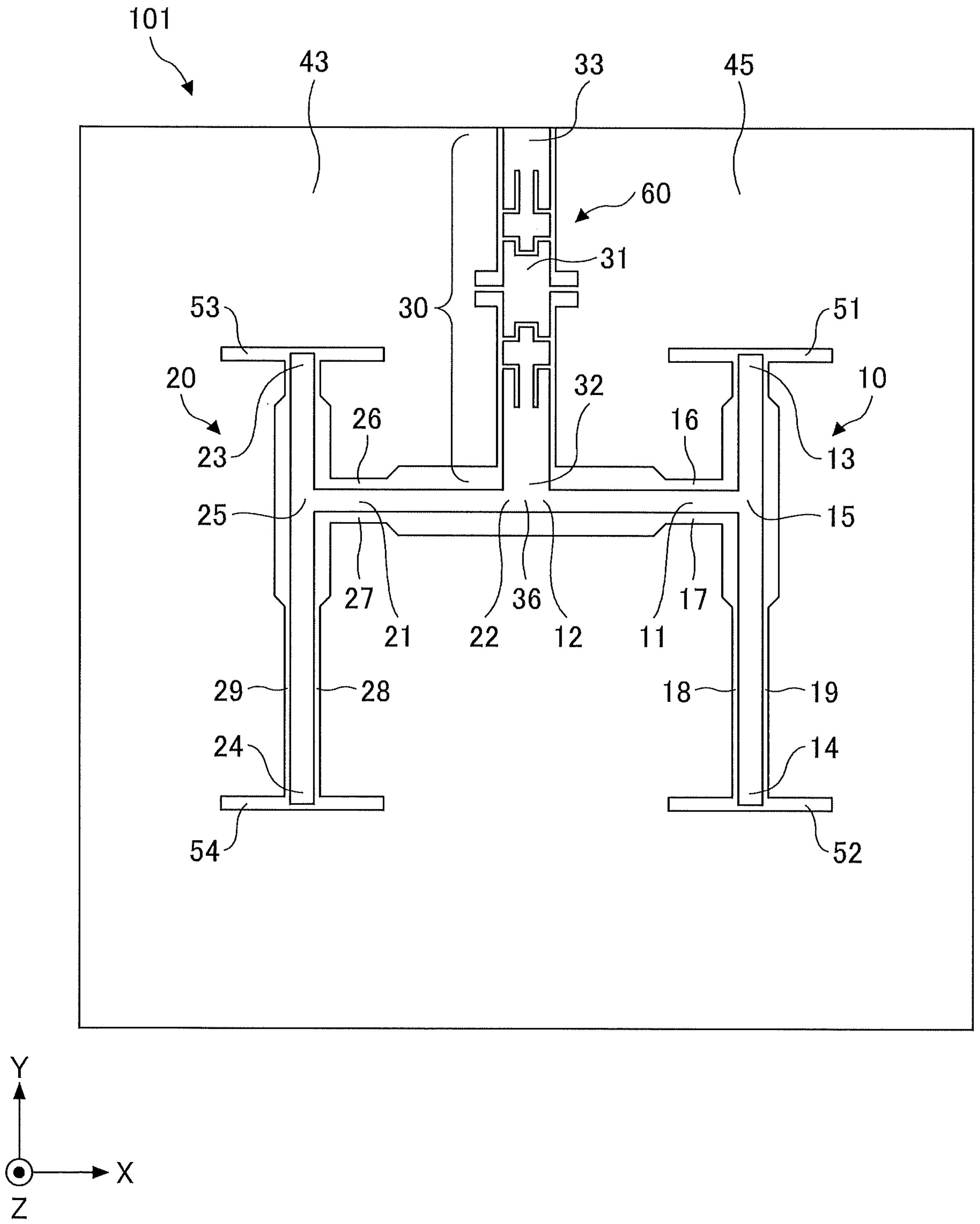
FIG. 9 is a plan view illustrating a slot array antenna equipped with an LC filter.
Figure 10:
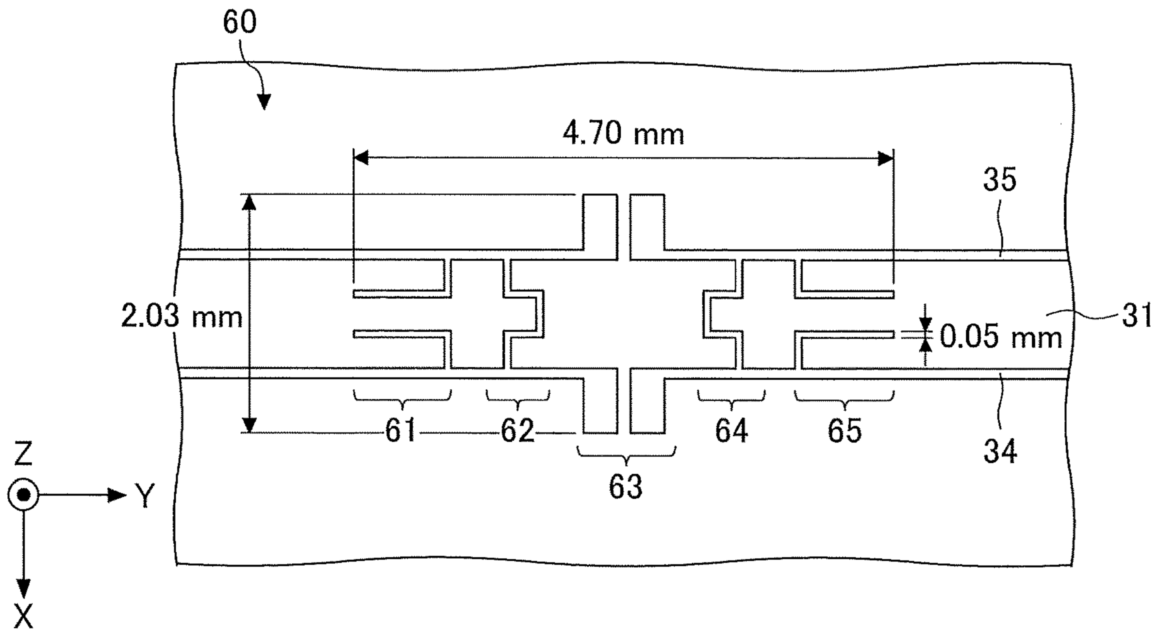
FIG. 10 is an enlarged figure of FIG. 9.

FIG. 9 is a plan view illustrating a slot array antenna equipped with an LC filter. FIG. 10 is an enlarged figure of FIG. 9. If at least one LC filter is provided in at least one of the power feeding unit, the first coplanar waveguide, the second coplanar waveguide and the third coplanar waveguide, the reduction of the antenna gain due to noise can be suppressed. FIG. 9 illustrates the configuration where the LC filter 60 is added to the coplanar waveguide 30 (the third coplanar waveguide) which is the power feeding unit.

The LC filter 60 is, for example, a bandpass filter that passes a high frequency signal of a predetermined frequency band passing through the power feeding unit or the coplanar waveguide and blocks a high frequency signal of a frequency band other than the predetermined frequency band.

The LC filter 60 is a circuit including at least one inductance unit (L) and at least one capacitance unit (C) and, in the case of shown in the figure, is formed with a planar pattern. By forming the LC filter with a planar pattern, it is possible to prevent the external dimensions of the slot array antenna in the Z-axis direction from increasing due to the addition of the LC filter.

In the case of FIG. 10, the LC filter 60 includes three inductance units 61, 63, 65, and two capacitance units 62, 64. The inductance units 61, 65 are formed by a pair of slots branched from the slots 34, 35. The capacitance units 62, 64 are formed by a slot which is short-circuiting the slots 34 and 35 via a bent part. The inductance unit 63 is formed by a pair of gap parts inserted in series into the slots 34, 35.

Figure 11:
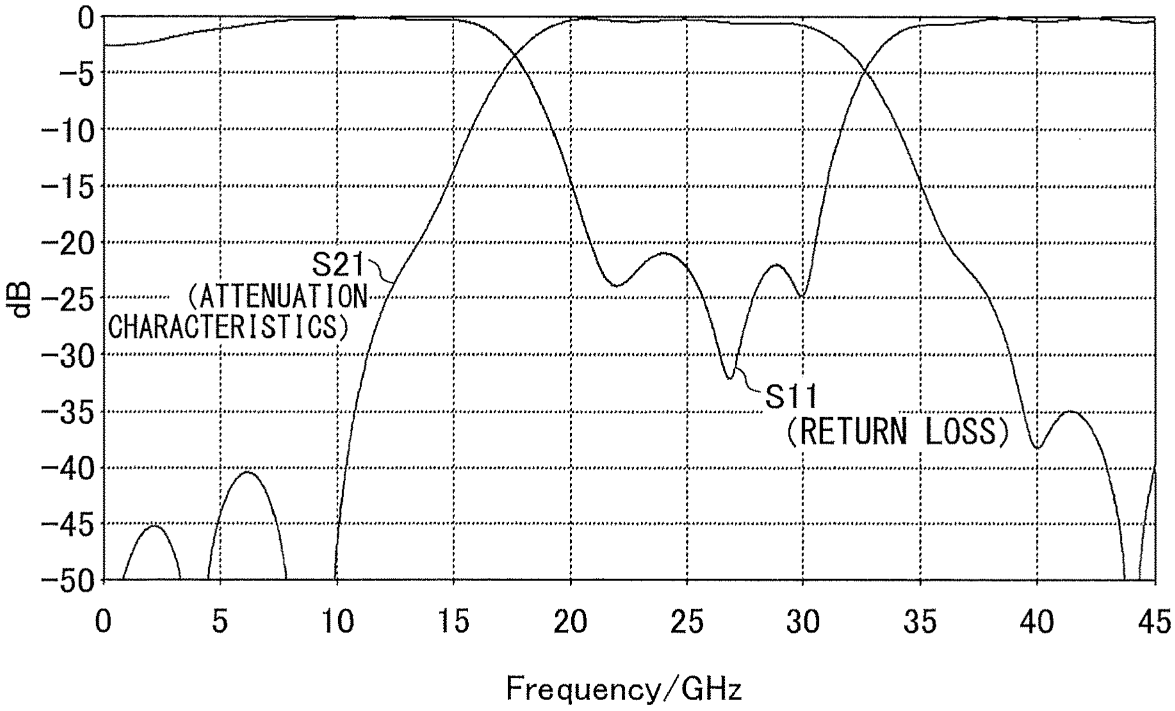
FIG. 11 illustrates the filter characteristics of the LC filter.

FIG. 11 illustrates the filter characteristics of the LC filter 60. As shown in FIG. 11, the LC filter 60 has attenuation characteristics to block high frequency signals in frequency bands other than those used by the slot array antenna 101.

Furthermore, the LC filter may not be limited to the case where its shape is formed with a planar pattern, for example, a filter circuit may be formed with a plurality of discrete elements. However, the LC filter is preferably formed with a planar pattern, because loss due to a connecting point with discrete elements and the like can be reduced.

Figure 12:
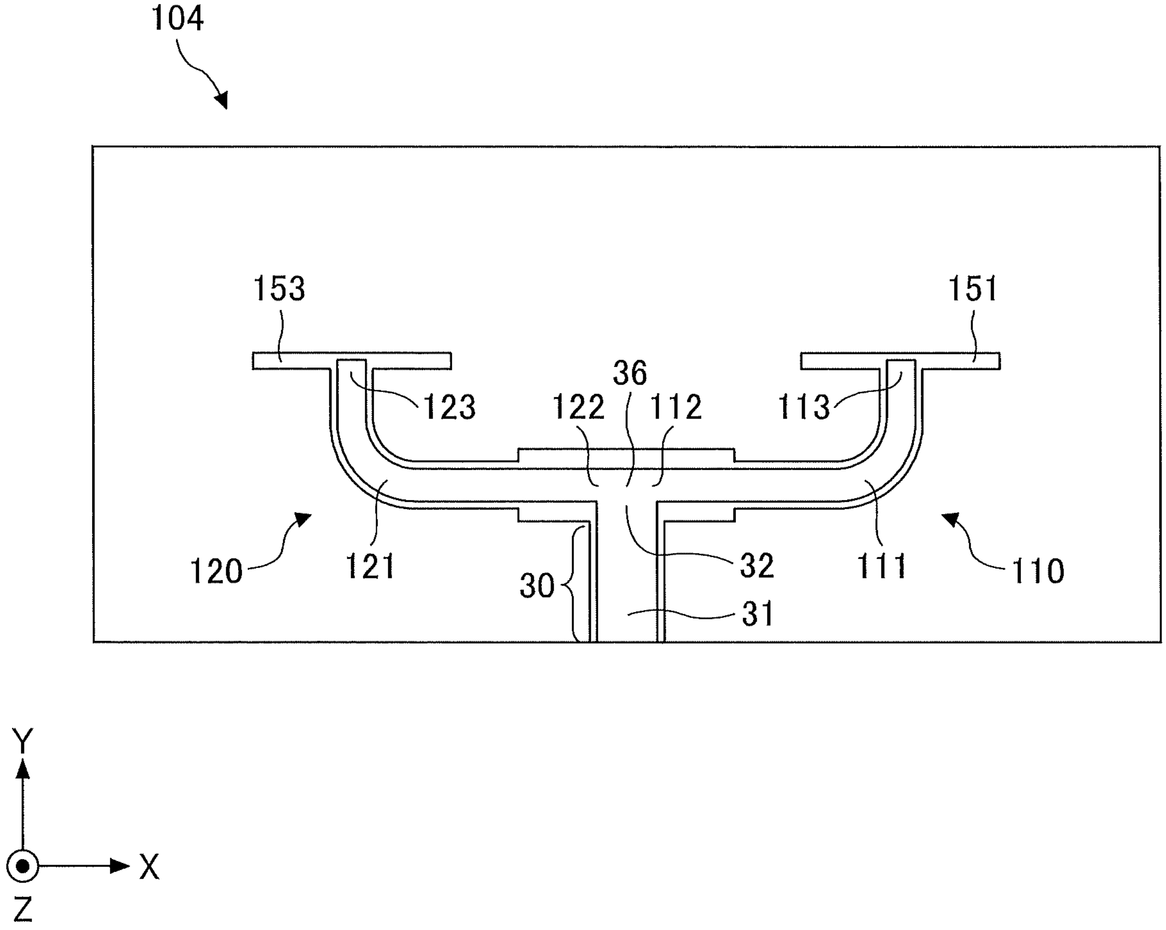
FIG. 12 is a plan view illustrating a slot array antenna of the fourth embodiment.

FIG. 12 is a plan view illustrating a slot array antenna of the fourth embodiment according to the present disclosure. The description of the similar configuration and effect as those of the above-described embodiment will be omitted by referring the above description. The slot array antenna 104 shown in FIG. 12 includes a different number of slots compared to the slot array antenna 101 shown in FIG. 1. The slot array antenna 104 includes two slots 151, 153.

In other words, the number of slots connected to each end part of the first coplanar waveguide and the second coplanar waveguide may be at least one or more, and may be odd or even.

The slot array antenna 104 shown in FIG. 12 includes a dielectric layer 40, a plurality of coplanar waveguides 30, 110, 120, and two slots 151, 153.

A coplanar waveguide 110 is an example of a first coplanar waveguide and is a plane transmission line formed in an L-shape in the conductor layer 43. A coplanar waveguide 110 includes a first waveguide extending in the X-axis direction and a second waveguide extending in the Y-axis direction. A coplanar waveguide 110 includes a pair of slots bent in an L-shape and a center conductor 111 extending in an L-shape sandwiched between the pair of slots. A coplanar waveguide 110 includes an end part 112 connected to the branching point 36 and an end part 113 connected to the slot 151. The end part 112 is an example of a first end part, and the end part 113 is an example of a second end part. There is no branching point between the end part 112 and the end part 113 of the coplanar waveguide 110.

A coplanar waveguide 120 is an example of a second coplanar waveguide and is a plane transmission line formed in an L-shape in the conductor layer 43. A coplanar waveguide 120 includes a first waveguide extending in the X-axis direction and a second waveguide extending in the Y-axis direction. A coplanar waveguide 120 includes a pair of slots bent in an L-shape and a center conductor 121 extending in an L-shape sandwiched between the pair of slots. A coplanar waveguide 120 includes an end part 122 connected to the branching point 36 and an end part 123 connected to the slot 153. The end part 122 is an example of a first end part, and the end part 123 is an example of a second end part. There is no branching point between the end part 122 and the end part 123 of the coplanar waveguide 120.

Figure 13:
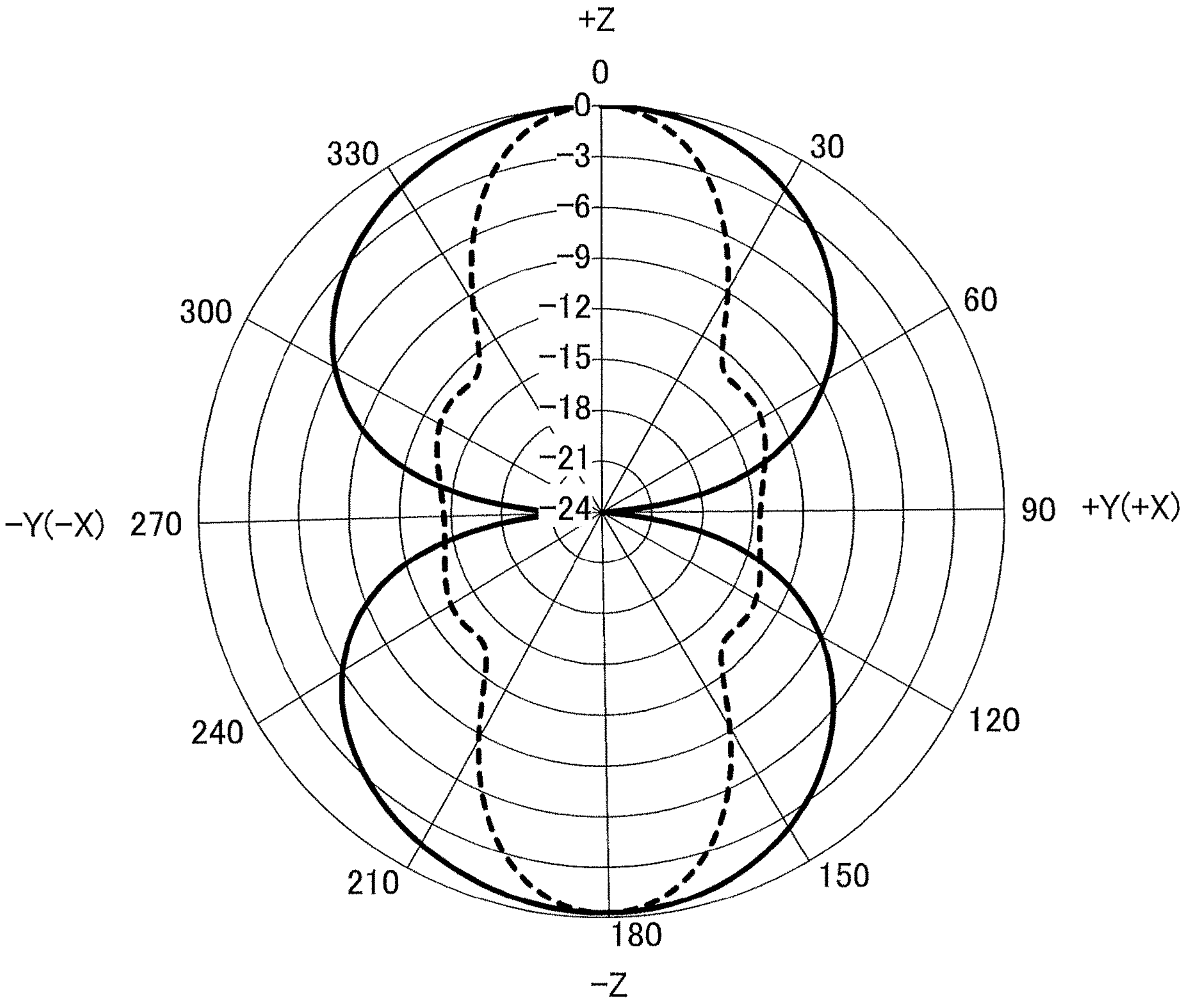
FIG. 13 illustrates a directivity of the slot array antenna of the fourth embodiment.

FIG. 13 illustrates the directivity of the slot array antenna 104 for the vertically polarized 28 GHz electromagnetic waves, and illustrates the antenna gain of the YZ plane and the XZ plane respectively. As shown in FIG. 13, the direction of directivity is directed to both the positive and negative sides of the Z-axis direction, and 7.9 dBi was obtained as the peak value of antenna gain.

Figure 14:
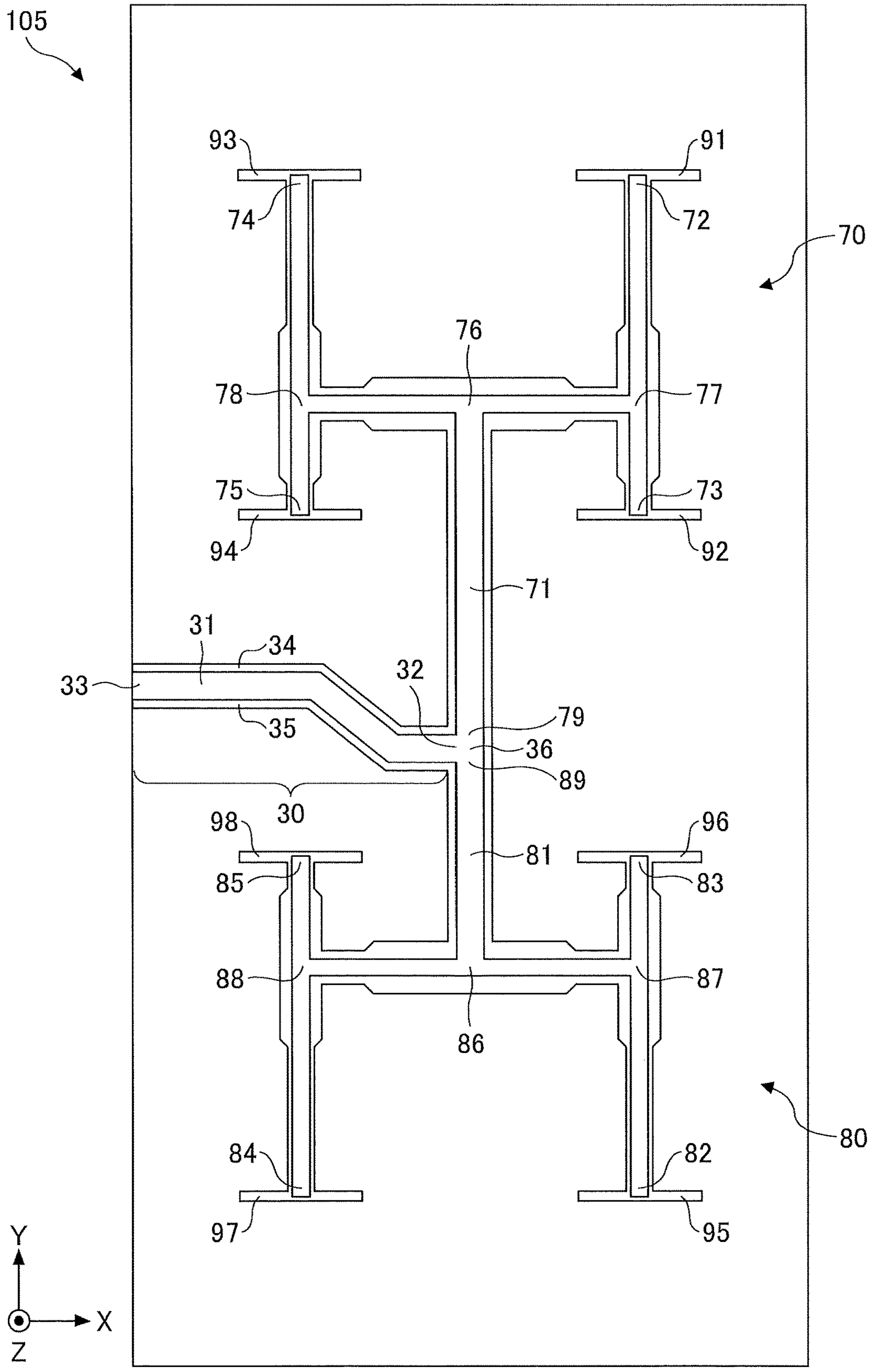
FIG. 14 is a plan view illustrating a slot array antenna of the fifth embodiment.

FIG. 14 is a plan view illustrating a slot array antenna of the fifth embodiment according to the present disclosure. The description of the similar configuration and effect as those of the above-described embodiment will be omitted by referring the above description. The slot array antenna 105 shown in FIG. 14 includes a different number of slots compared to the slot array antenna 101 shown in FIG. 1. The slot array antenna 105 includes eight slots 91-98.

The slot array antenna 105 shown in FIG. 14 includes a dielectric layer 40, a plurality of coplanar waveguides 30, 70, 80, and eight slots 91-98. The coplanar waveguides 70, 80 are arranged in the Y-axis direction in the slot array antenna 105.

A coplanar waveguide 70 is an example of a first coplanar waveguide and is a plane transmission line formed so as to include an H-shape in the conductor layer 43. A coplanar waveguide 70 includes a pair of slots formed so as to include an H-shape and a center conductor 71 extending between the pair of slots. A coplanar waveguide 70 includes an end part 79 connected to the branching point 36, an end part 72 connected to the slot 91, an end part 73 connected to the slot 92, an end part 74 connected to the slot 93, and an end part 75 connected to the slot 94. The end part 79 is an example of a first end part, and the end parts 72-75 are examples of a second end part. A coplanar waveguide 70 includes three points to be junctions (branching point 76, 77, 78) for the slots 91-94 between the end part 79 and the end parts 72-75.

A coplanar waveguide 80 is an example of a second coplanar waveguide and is a plane transmission line formed so as to include an H-shape in the conductor layer 43. A coplanar waveguide 80 includes a pair of slots formed so as to include an H-shape and a center conductor 81 extending between the pair of slots. A coplanar waveguide 80 includes an end part 89 connected to the branching point 36, an end part 82 connected to the slot 95, an end part 83 connected to the slot 96, an end part 84 connected to the slot 97, and an end part 85 connected to the slot 98. The end part 89 is an example of a first end part, and the end parts 82-85 are examples of a second end part. A coplanar waveguide 80 includes three points to be junctions (branching point 86, 87, 88) for the slots 95-98 between the end part 89 and the end parts 82-85.

Furthermore, the coplanar waveguide 30 may be linear, but also may be bent for sufficiently securing a distance from the slot in order to suppress deterioration of the characteristics such as directivity due to a coupling caused by proximity to the slot functioning as the antenna element. In the case of FIG. 14, the coplanar waveguide 30 is bent so that a sufficient distance from the slot 98 can be obtained. By bending the coplanar waveguide as shown in FIG. 14, the characteristics such as directivity can be improved more than the case where the coplanar waveguide is not bent.

Figure 15:
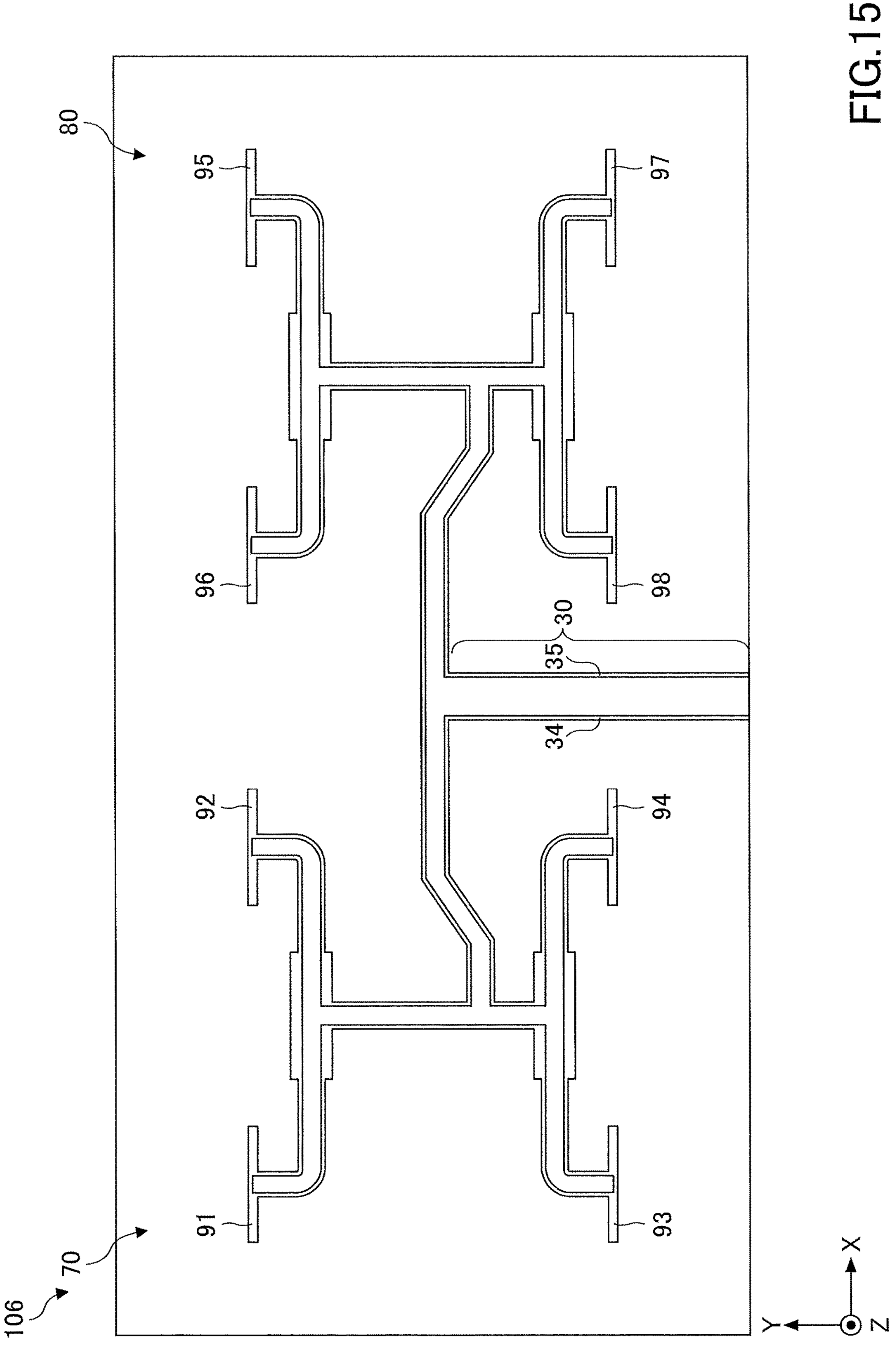
FIG. 15 is a plan view illustrating a slot array antenna of the sixth embodiment.

FIG. 15 is a plan view illustrating a slot array antenna of the sixth embodiment according to the present disclosure. The description of the similar configuration and effect as those of the above-described embodiment will be omitted by referring the above description. In the slot array antenna 106 shown in FIG. 15, the arrangement direction of the coplanar waveguides 70, 80 is different from the slot array antenna 105 shown in FIG. 14. The coplanar waveguides 70, 80 are arranged so as to be aligned in the X-axis direction in the slot array antenna 106.

Figure 16:
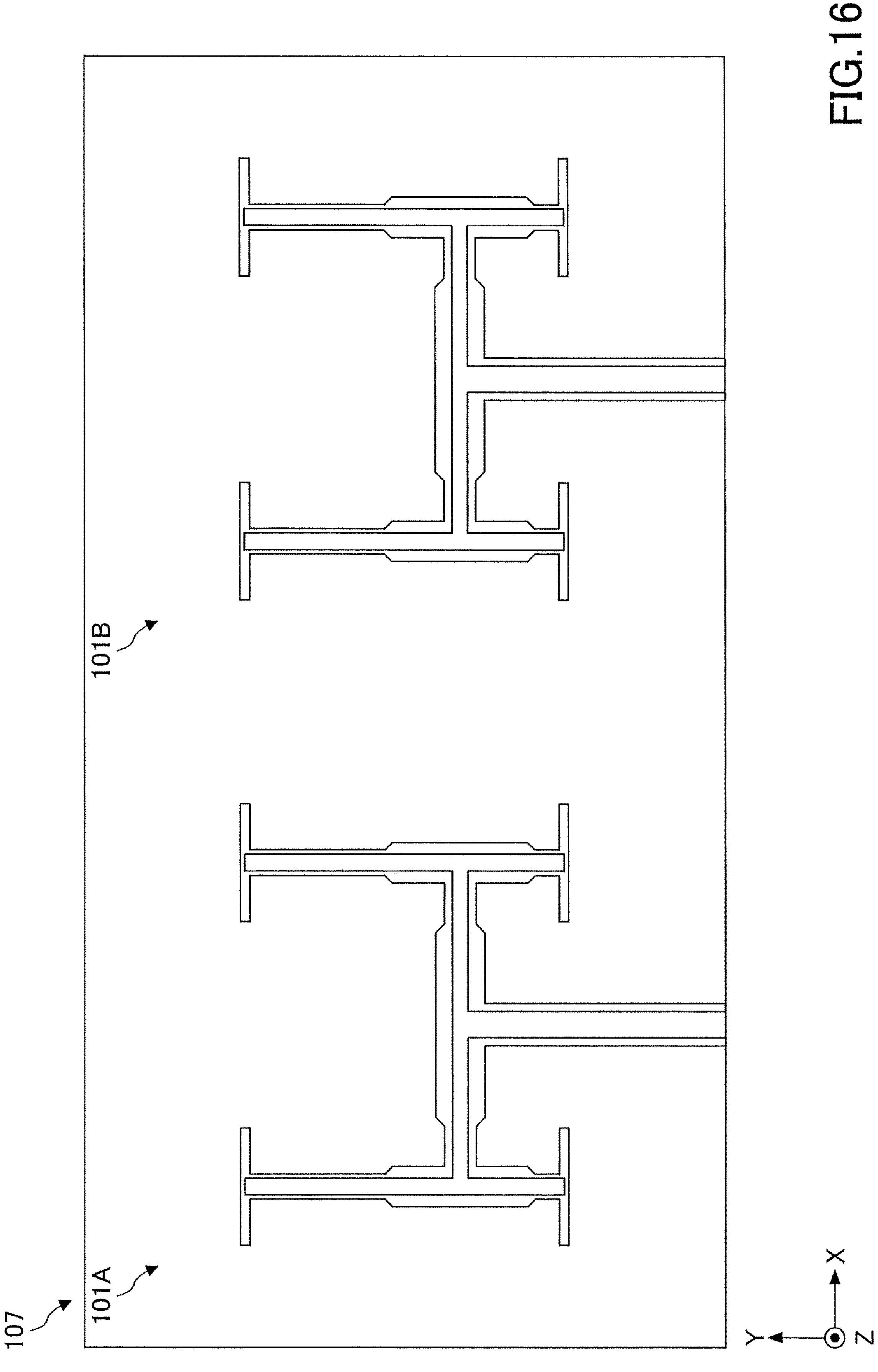
FIG. 16 is a plan view illustrating a MIMO (Multiple-Input and Multiple-Output) antenna equipped with a plurality of slot array antennas.

FIG. 16 is a plan view illustrating a MIMO equipped with a plurality of slot array antennas. The description of the similar configuration and effect as those of the above-described embodiment will be omitted by referring the above description. The MIMO antenna 107 shown in FIG. 16 is equipped with two slot array antennas 101A, 101B with separate power feeding unit, and functions as a two-channel MIMO antenna. The slot array antennas 101A, 101B respectively include the same shape as the slot array antenna 101 of FIG. 1, but also other shapes may be applied.

Figure 17:
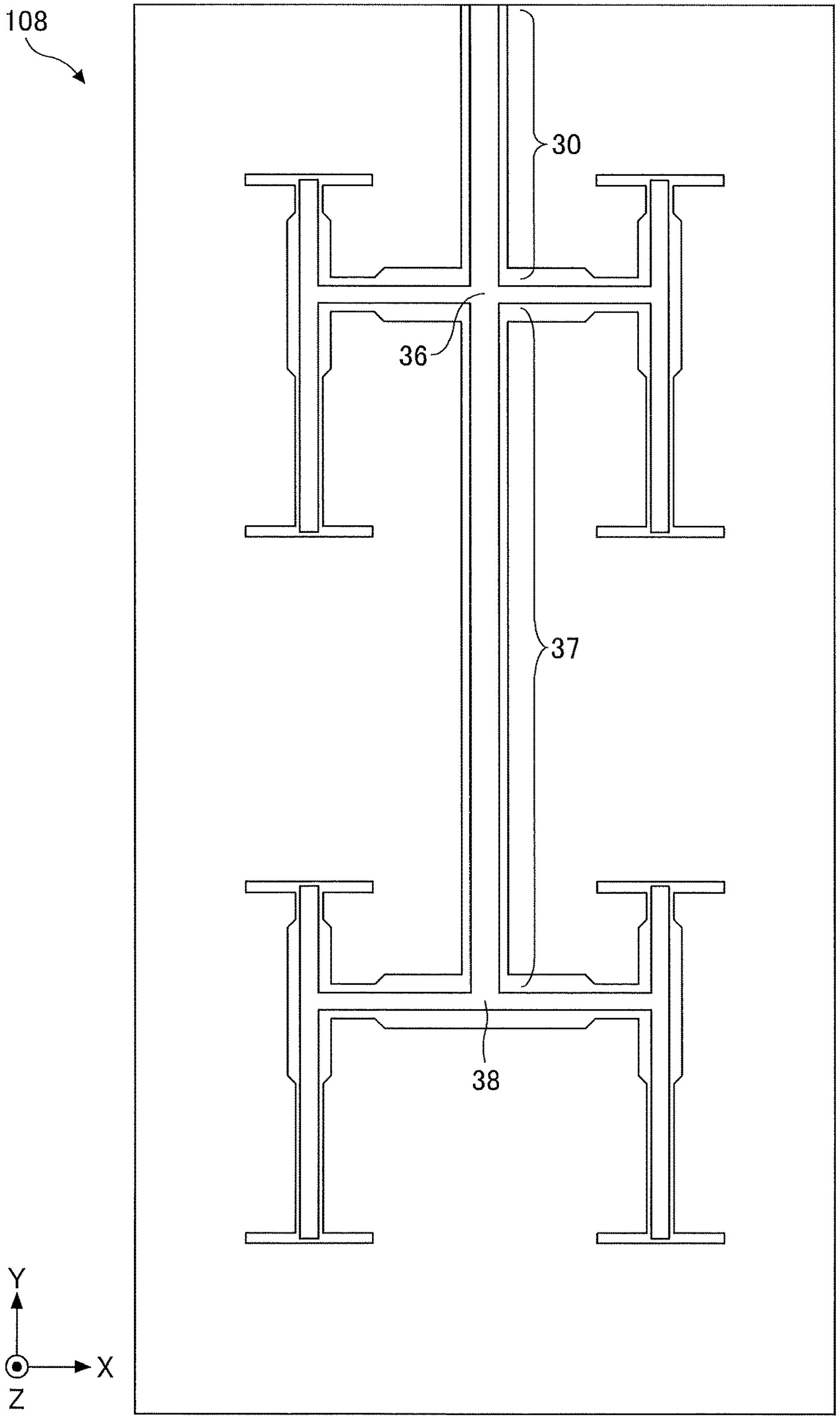
FIG. 17 is a plan view illustrating a slot array antenna of the seventh embodiment.
Figure 18:
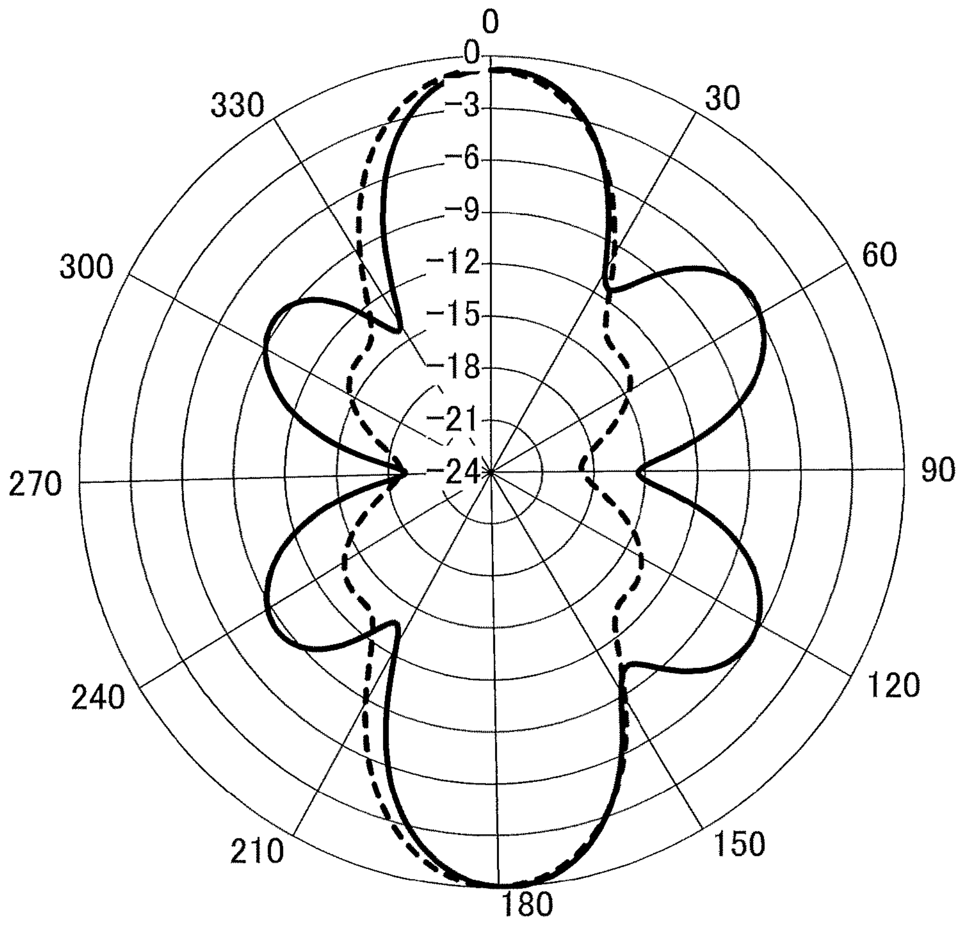
FIG. 18 illustrates the directivity of the slot array antenna in the first embodiment in the case of D1, D2=λ/4.
Figure 19:
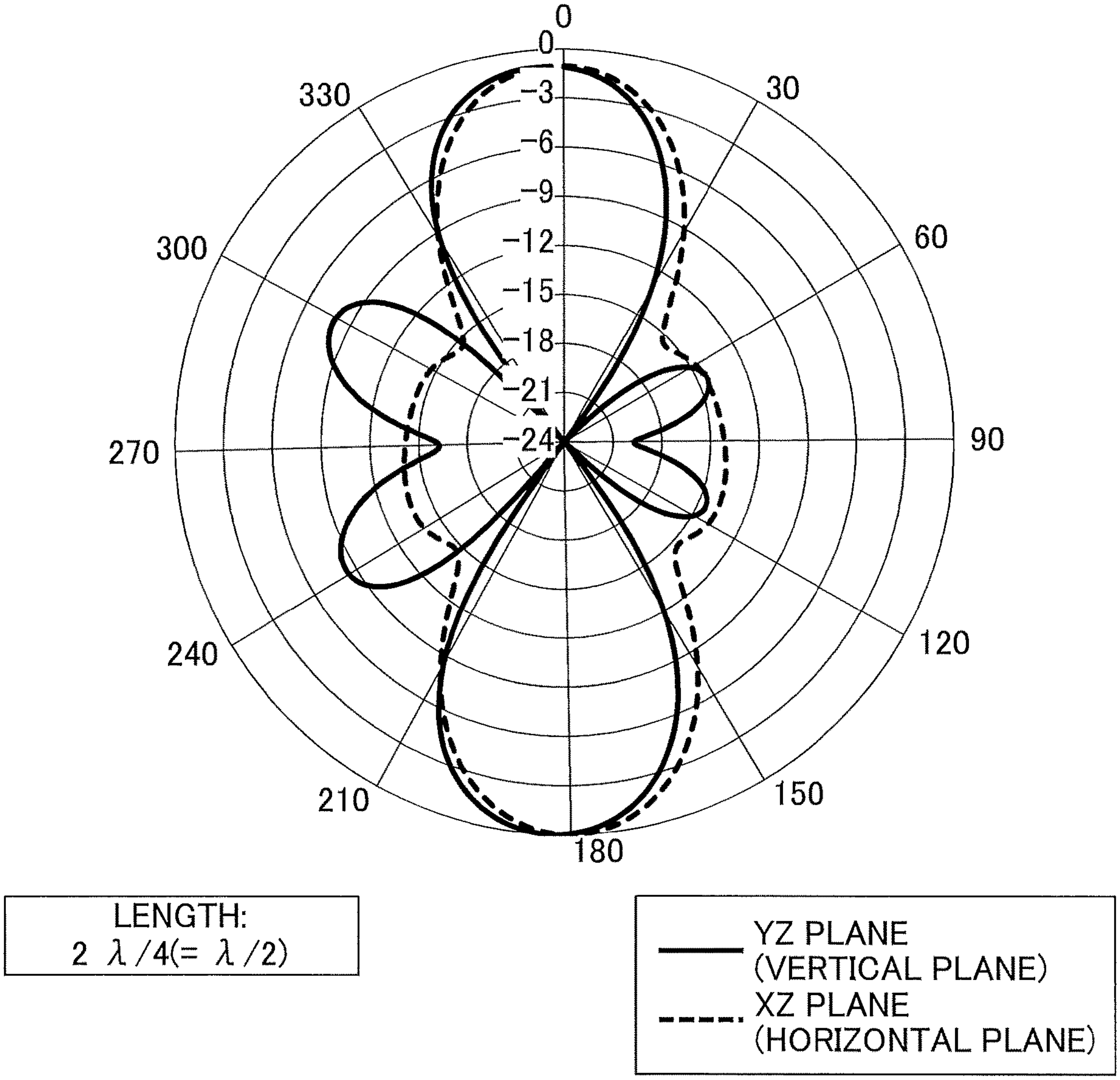
FIG. 19 illustrates the directivity of the slot array antenna in the first embodiment in the case of D1, D2=2λ/4.
Figure 20:
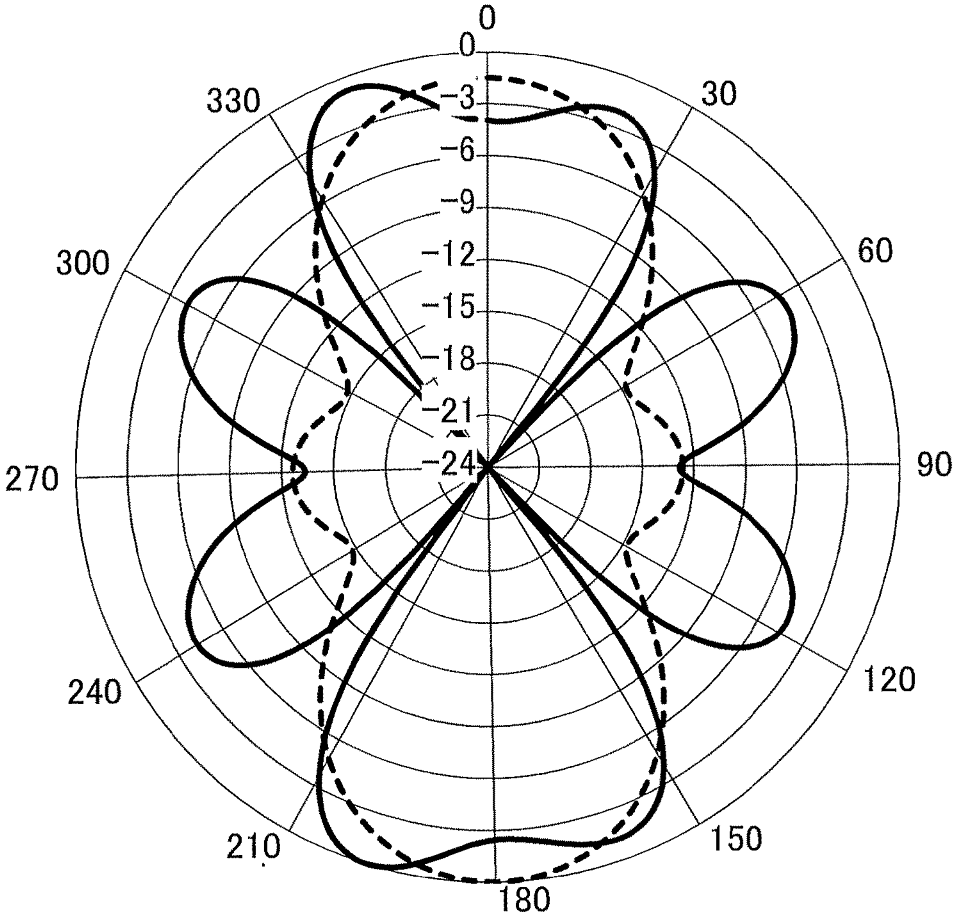
FIG. 20 illustrates the directivity of the slot array antenna in the first embodiment in the case of D1, D2=3λ/4.
Figure 21:
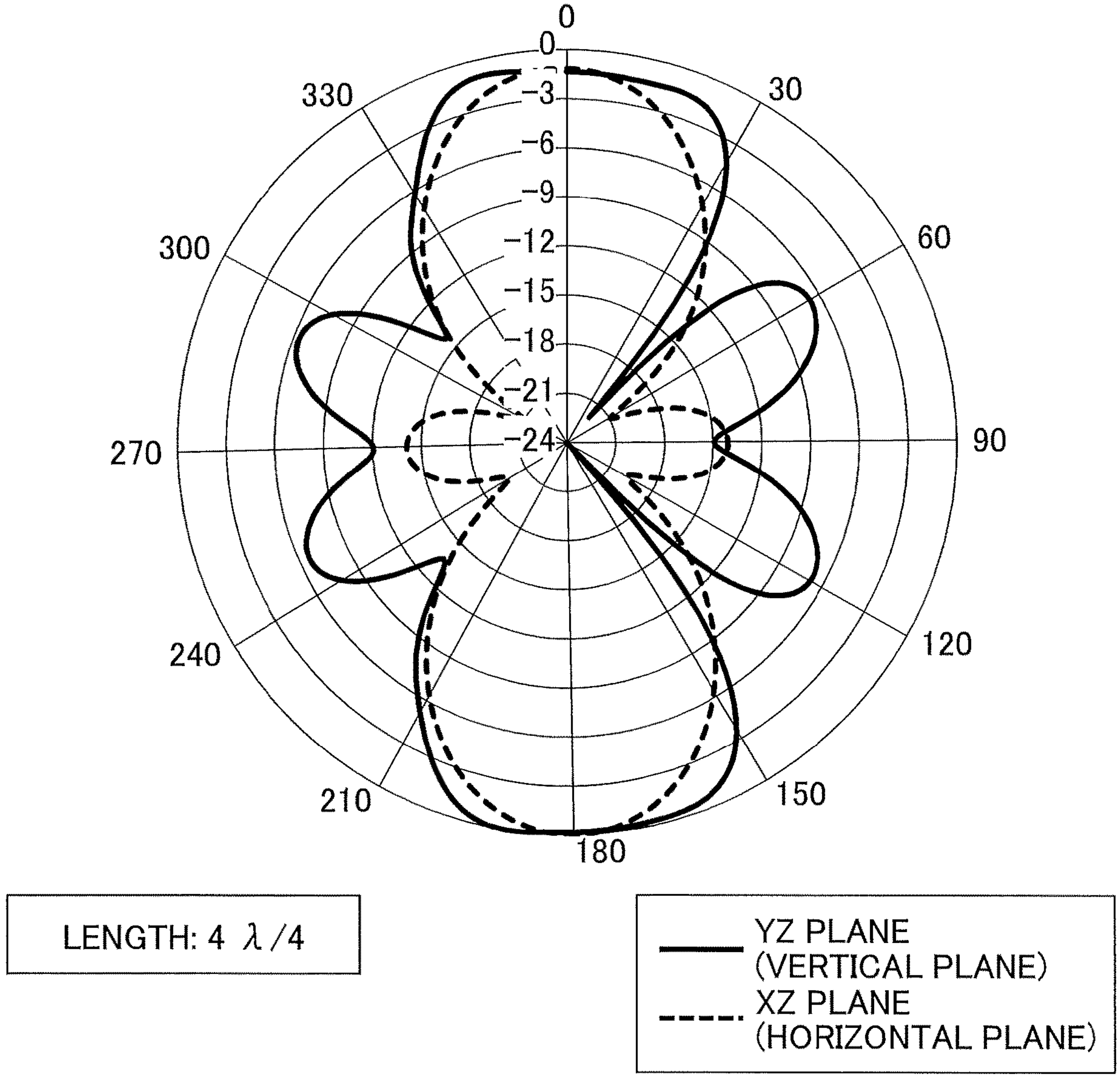
FIG. 21 illustrates the directivity of the slot array antenna in the first embodiment in the case of D1, D2=4λ/4.

Furthermore, although the slot array antenna of the first to sixth embodiments all include the branching points 36, 136 branching into two coplanar waveguides, there is no limitation to this configuration. For example, based on the slot array antenna 101 of the first embodiment, the coplanar waveguide 30 may not only be divided into two coplanar waveguides from the branching point 36 but also include an extended coplanar waveguide 37 which passes through the branching point 36 and goes straight as shown in FIG. 17. In other words, as the slot array antenna 108 of the seventh embodiment shown in FIG. 17, a branching point 38 may be further provided on the extended coplanar waveguide 37, and two coplanar waveguides branching from the branching point may be included. In this case, the third coplanar waveguide corresponding to the power feeding unit includes the extended coplanar waveguide 37 connecting the pair of coplanar waveguides (left and right) and the other pair of coplanar waveguides. In this example, the branching point 36 is positioned as the center of the cross and includes four T-shaped coplanar waveguides and eight linear slots. Furthermore, the LC filter may be disposed on the extended coplanar waveguide 37 within the third coplanar waveguide.

As previously described, the line shape of the branching points 36, 136 is T-shaped. However, in order to satisfy the specifications of antenna transmitting/receiving sensitivity and directivity, the branching point of the slot array antenna may not only be T-shaped but also include one or more cross-shaped lines in accordance with the number of (linear) slots. In this case, the slot array antenna typically includes N cross-shaped branching points, and one T-shaped branching point. If coplanar waveguides branching from each branching point include M (linear) slots respectively, the slot array antenna includes (N+1)×M (linear) slots. FIG. 17 illustrates the case of N=1 and M=4.

The slot array antenna has been described with reference to the embodiments, but the present invention is not limited to the above embodiments. Various modifications and improvements, such as combination with part or all of the other embodiments and substitution, are possible within the scope of the present invention.

What is claimed is:

1. A slot array antenna, comprising:

a dielectric layer having a first surface and a second surface opposite to the first surface;

a power feeding unit;

a first coplanar waveguide formed in a conductor layer provided on the first surface of the dielectric layer; and a second coplanar waveguide formed in the conductor layer, wherein each of the first coplanar waveguide and the second coplanar waveguide includes (a) a first end part connected to a point to which the power feeding unit is connected or situated in proximity and (b) at least one second end part connected to at least one slot formed in the conductor layer, wherein for each of the at least one slot formed in the conductor layer, a shortest distance from the slot to a nearest end edge of the conductor layer, which end edge is parallel to a longitudinal direction of the slot, is the same, wherein the power feeding unit is a strip conductor provided on the second surface of the dielectric layer, wherein the strip conductor is configured to feed power to the first and the second waveguides by contactless feeding, and wherein a portion of the strip conductor overlaps with the point when viewed in a direction perpendicular to the first surface and the second surface of the dielectric layer.

2. The slot array antenna according to claim 1, wherein at least one of the first coplanar waveguide and the second coplanar waveguide includes at least one branch between the first end part and the second end part.

3. The slot array antenna according to claim 1, wherein a longitudinal direction of the slot of the first coplanar waveguide and a longitudinal direction of the slot of the second coplanar waveguide are parallel to each other.

4. The slot array antenna according to claim 1, wherein the slots of the first coplanar waveguide and the second coplanar waveguide are symmetrically positioned with respect to a symmetry axis.

5. The slot array antenna according to claim 1, wherein each of the first coplanar waveguide and the second coplanar waveguide is connected to the slot at the second end part at right angles to a longitudinal direction of the slot.

6. The slot array antenna according to claim 1, further comprising at least one LC filter in at least one of the power feeding unit, the first coplanar waveguide, and the second coplanar waveguide.

7. The slot array antenna according to claim 6, wherein the LC filter is a filter formed with a planar pattern.

8. The slot array antenna according to claim 1, further comprising a conductor not connected to the conductor layer on the second another surface of the dielectric layer.

9. The slot array antenna according to claim 1, further comprising a conductor not connected to the conductor layer, wherein the conductor not connected to the conductor layer is provided apart from the second surface of the dielectric layer.

10. The slot array antenna according to claim 1, wherein the slots are positioned at least one in each of four areas divided by two virtual straight lines intersecting, and orthogonal to each other, at the point.

11. The slot array antenna according to claim 1, wherein the strip conductor has a first end part and a second end part, wherein the second end part is configured to be connected to an external device.

12. The slot array antenna according to claim 11, wherein the external device is an amplifier.

13. The slot array antenna according to claim 11, wherein the second end part of the strip conductor is at an edge of the dielectric layer.

* * * * *